(12) United States Patent
Behdad

(10) Patent No.: US 8,849,229 B2
(45) Date of Patent: *Sep. 30, 2014

(54) ELECTRICALLY SMALL, SUPER DIRECTIVE ANTENNAS

(75) Inventor: Nader Behdad, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 80 days.

This patent is subject to a terminal disclaimer.

(21) Appl. No.: 13/486,269

(22) Filed: Jun. 1, 2012

(65) Prior Publication Data

US 2013/0324061 A1 Dec. 5, 2013

(51) Int. Cl.
*H04B 7/00* (2006.01)
*G01S 5/04* (2006.01)

(52) U.S. Cl.
USPC ............ 455/242.1; 455/242.2; 455/243.1; 455/276.1; 455/304; 342/442

(58) Field of Classification Search
USPC ........... 455/242.1, 242.2, 243.1, 276.1, 304, 455/130, 193.2, 197.2, 139, 303; 342/442, 342/434, 445, 448
See application file for complete search history.

(56) References Cited

U.S. PATENT DOCUMENTS

| | | | |
|---|---|---|---|
| 5,771,439 A * | 6/1998 | Kennedy et al. | 455/63.1 |
| 5,786,791 A | 7/1998 | Bruckert | |
| 5,959,580 A | 9/1999 | Maloney et al. | |
| 5,963,173 A | 10/1999 | Lian et al. | |
| 6,141,558 A | 10/2000 | Chen | |
| 6,288,676 B1 | 9/2001 | Maloney | |
| 6,759,982 B2 | 7/2004 | Akazawa et al. | |
| 7,026,991 B2 | 4/2006 | Hamada et al. | |
| 7,068,221 B2 | 6/2006 | Xin | |
| 7,084,812 B2 | 8/2006 | Xin | |
| 7,313,403 B2 | 12/2007 | Gong et al. | |
| 7,340,259 B2 | 3/2008 | Maloney et al. | |
| 7,352,325 B1 * | 4/2008 | Floyd et al. | 342/372 |
| 7,391,371 B2 | 6/2008 | Hamada et al. | |
| 7,924,225 B2 | 4/2011 | Mak et al. | |
| 8,134,516 B1 | 3/2012 | Yaghjian et al. | |

(Continued)

FOREIGN PATENT DOCUMENTS

| | | |
|---|---|---|
| EP | 1435526 | 7/2004 |
| JP | 2002051372 | 2/2002 |

OTHER PUBLICATIONS

Non-Final Office Action issued by the USPTO in U.S. Appl. No. 12/949,276, Sep. 12, 2012.

(Continued)

*Primary Examiner* — Pablo Tran
(74) *Attorney, Agent, or Firm* — Bell & Manning, LLC

(57) ABSTRACT

An electrically small receiver system is provided. The receiver system includes a plurality of antennas and a signal processing circuit. The plurality of antennas includes a first antenna configured to receive a first signal and a second antenna configured to receive a second signal. The signal processing circuit includes a phase shifter configured to apply a phase shift to the received second signal. The phase shift applied by the phase shifter is a function of an angle of incidence of the second signal measured relative to a boresight direction of the plurality of antennas. The signal processing circuit is configured to form an output signal that is a combination of the received first signal and the phase shifted second signal.

20 Claims, 20 Drawing Sheets

(56) References Cited

U.S. PATENT DOCUMENTS

| | | | |
|---|---|---|---|
| 2004/0209571 A1* | 10/2004 | Saegrov | 455/63.1 |
| 2007/0159393 A1 | 7/2007 | Imai | |
| 2008/0007455 A1 | 1/2008 | Shirakawa | |
| 2009/0079635 A1 | 3/2009 | Xin | |
| 2012/0080957 A1 | 4/2012 | Cooper et al. | |
| 2012/0127035 A1 | 5/2012 | Behdad et al. | |
| 2012/0313820 A1* | 12/2012 | Tyree | 342/450 |

OTHER PUBLICATIONS

Yoo et al., Biometic Direction Sensitive Micromachined Diaphragm for Ultrasonic Transducers, 2001 IEEE Ultrasonics Symposium, vol. 2, 2001, pp. 887-890.

Cui et al., Optical Sensing in a Directional MEMS Microphone Inspired by the Ears of the Parasitoid fly *Ormian ochracea*, In Proc. of the 19th International Conference on Micro Electro Mechanical Systems, Istanbul, Turkey, 2006, pp. 614-617.

Miles et al., The Development of a Biologically-Inspired Directional Microphone for Hearing Aids, Audiology and Neurotology, vol. 11, 2006, pp. 86-94.

Miles et al., A Low Noise Differential Microphone Inspired by the Ears of the Parasitoid Fly *Ormia ochracea*, J. Acoustic. Soc. An., vol. 125, 2009, pp. 2013-2026.

Xin et al., An Improved Two-Antenna Direction of Arrival (DOA) Technique Inspired by Human Ears, Proc. IEEE AP-S Intl Symp., vol. 1, San Diego, CA, Jul. 5-11, 2008, pp. 1-4.

Michelsen, Hearing and Sound Communication in Small Animals: Evolutionary Adaptations to the Laws of Physics, The Evolutionary Biology of Hearing, 1992, Springer, New York, pp. 61-77.

Behdad et al., Super-Resolving Biomimetic Electrically Small Antennas and Their Applications, Accepted to the 2010 Antenna Applications Symposium, Robert Allerton Park, Monticello, IL, Sep. 21-23, 2010.

Behdad et al., Biomimetic Electrically Small Antennas, 2010 IEEE International Conference on Wireless Information Technology and Systems, Honolulu, Hawaii, USA, Aug. 28-Sep. 3, 2010.

Miles et al., Mechanically Coupled Ears for Directional Hearing in the Parasitoid Fly *Ormia ochracea*, J. Acoust. Soc. Am., vol. 98, Dec. 1995, pp. 3059-3070.

Robert et al., Directional Hearing by Mechanical Coupling in the Parasitoid Fly *Ormia ochracea*, J Comp. Physiol. A, vol. 179, Jul. 1996, pp. 29-44.

Akcakaya et al., Biologically inspired coupled antenna beampattern design, Bioinspiration & Biomimetics, vol. 5, No. 4, Nov. 10, 2010.

Behdad, Presentation "A Biologically-Inspired Method for Designing Super-Directive Electrically Small Antennas", Jul. 2011.

\* cited by examiner

ELECTRICALLY SMALL, SUPER DIRECTIVE ANTENNAS

REFERENCE TO GOVERNMENT RIGHTS

This invention was made with government support under 1052074 awarded by the National Science Foundation. The government has certain rights in the invention.

BACKGROUND

Electrically small antennas have been the subject of many studies over the past few decades. An "electrically-small" antenna refers to an antenna or antenna element with relatively small geometrical dimensions compared to the wavelength of the electromagnetic fields the antenna radiates. In particular, a number of theoretical studies have examined the relationship between the electrical dimensions (physical dimensions normalized to the wavelength) of an antenna and its radiation characteristics including gain, radiation efficiency, bandwidth, and directional characteristics. These studies point to a set of either fundamental or practical limitations that govern the performance of such antennas. In particular, as the electrical dimensions of an antenna are decreased, the radiation efficiency and bandwidth also decrease. As a result, these studies propose a set of fundamental limits that predict the upper bounds of these radiation parameters.

Similar theoretical studies have been carried out to investigate the relationship between the directionality of an antenna array or continuous aperture and its electrical size. The results show that, in theory, achieving super-directivity is possible from an antenna array or a continuous aperture. In principle, such super-directive arrays can be used to precisely resolve the direction of arrival of an electromagnetic (EM) wave. However, when the overall electrical dimensions of the antenna array decrease, the nearby elements of the array must be excited with significantly oscillatory and widely varying excitation coefficients to achieve super-directional characteristics. Thus, though mathematically possible, the realization of such excitation coefficients is not practical for small antenna arrays due to problems such as mutual coupling between the elements and the tolerances required in device fabrication.

Studies have also been conducted in which the auditory system of the parasitic fly, *Ormia Ochracea*, has been analyzed due to the ability of the female fly to accurately resolve the call of the male fly despite the small distance between the ears of the female fly in relation to the wavelength of the call. Proposed antenna/signal processing designs based on the anatomy of the ears of the fly have shown enhanced resolution capabilities compared to regular antenna arrays that occupy the same area. In this context, resolution capability refers to the ability of the antenna array to detect the direction of arrival of an electromagnetic wave. However, the improved resolution capability has not translated to a higher gain or directivity for the antenna array. An inherent tradeoff exists between the angular sensitivity of the system and its output signal to noise ratio (SNR). In particular, as the angular sensitivity of the antenna increases, its output SNR decreases. This tradeoff exists in nature, where small animals that possess the sense of directional hearing have traded the capability to hear over long distances in favor of the capability of localizing the sound source of interest to a smaller area.

SUMMARY

In an illustrative embodiment, an electrically small receiver system is provided. The receiver system includes a plurality of antennas and a signal processing circuit. The plurality of antennas includes a first antenna configured to receive a first signal and a second antenna configured to receive a second signal. The signal processing circuit includes a phase shifter configured to apply a phase shift to the received second signal. The phase shift applied by the phase shifter is a function of an angle of incidence of the second signal measured relative to a boresight direction of the plurality of antennas. The signal processing circuit is configured to form an output signal that is a combination of the received first signal and the phase shifted second signal.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

An analogy can be drawn between the problem of super-resolving electrically small antennas and the sense of directional hearing in insects and small vertebrates. Many animals use sound waves for communication and sensing. The auditory system of such animals has evolved and adapted to be able to detect sound waves of interest and to localize their source. To achieve this, most animals use two ears, which act as pressure sensitive receivers excited by the pressure of an incoming sound wave. Based on the direction of incidence, the sound wave arrives at one ear earlier than the other. Additionally, the amplitude of the vibrations at the two ears is generally different due to the scattering caused by the animal's body. These differences in the time of arrival and the amplitude of the two received signals are the main cues used by the auditory system of most animals to determine the location of the sound emitting source.

In large animals and humans, the separation between the two ears is physically large and significant scattering of sound is created by the large head separating the two ears. This results in the large interaural time and intensity differences between the two received signals that can be easily detected by the animal's central nervous system. As the size of the animal decreases, however, these differences become smaller and smaller. Therefore, one would think that smaller animals and especially insects are inherently at a disadvantage when it comes to directional hearing. However, some small animals and insects demonstrate hyperacute directional hearing capabilities.

In these small animals/insects, the auditory organ is composed of two ears separated by a very small distance compared to the wavelength of the sound. Due to this small separation and the small size of the animal's head, there is little or no intensity difference between the level of sound that arrives at the two ears. Therefore, the only cues available for locating the source of sound are the small differences in the time of arrival of the sound between the two ears. The auditory systems of these animals amplify the minute differences in the time of arrival of sound and increase them to detectable levels to determine a direction of the sound source. Thus, the auditory system of these small animals/insects measures a pressure difference at each ear. For example, in the parasitoid fly *Ormia Ochracea*, the separation between the two ears is so small that the ears are physically connected together using a flexible mechanical lever. This coupled ear mechanism enhances the minute difference in the time of arrival of the sound wave between the two ears and amplifies it to a level that is detectable by the fly's simple nervous system.

Figure 1:
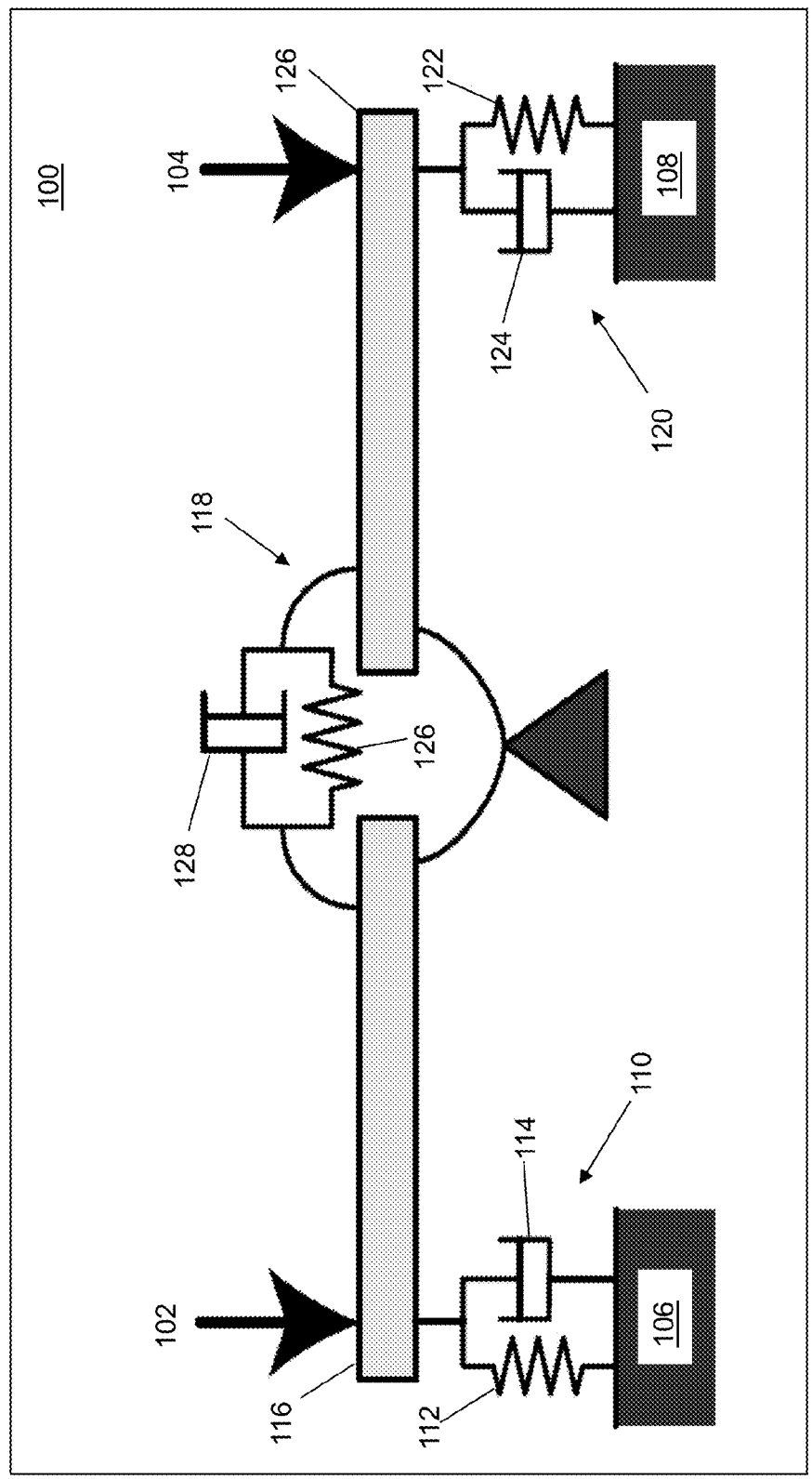
FIG. 1 depicts a block diagram of a mechanical system modeling a small insect auditory system in accordance with an illustrative embodiment.

With reference to FIG. 1, a mechanical model 100 of the fly's ear is shown in accordance with an illustrative embodiment, which has been shown to be capable of predicting the measured frequency response of the fly's ear with a reasonable degree of accuracy. Mechanical model 100 includes a second-order coupled resonator mechanical system with a first input 102, $f_1(\omega)$, and a second input 104, $f_2(\omega)$, which represent the forces exerted on each tympanal membrane by the sound wave, and a first output 106, $y_1(\omega)$, and a second output 108, $y_2(\omega)$, which represent the vibration amplitudes of each tympanal membrane. A first ear 110 is modeled as a first spring 112 and first damper 114 mounted in parallel from a first end 116 of a lever 118. Lever 118 connects first ear 110 with a second ear 120. Second ear 120 is modeled as a second spring 122 and second damper 124 mounted in parallel from a second end 126 of lever 118. A third spring 126 and a third damper 128 mounted in parallel across lever 118 couple first input 102 and second input 104 to generate first output 106 and second output 108.

Figure 2:
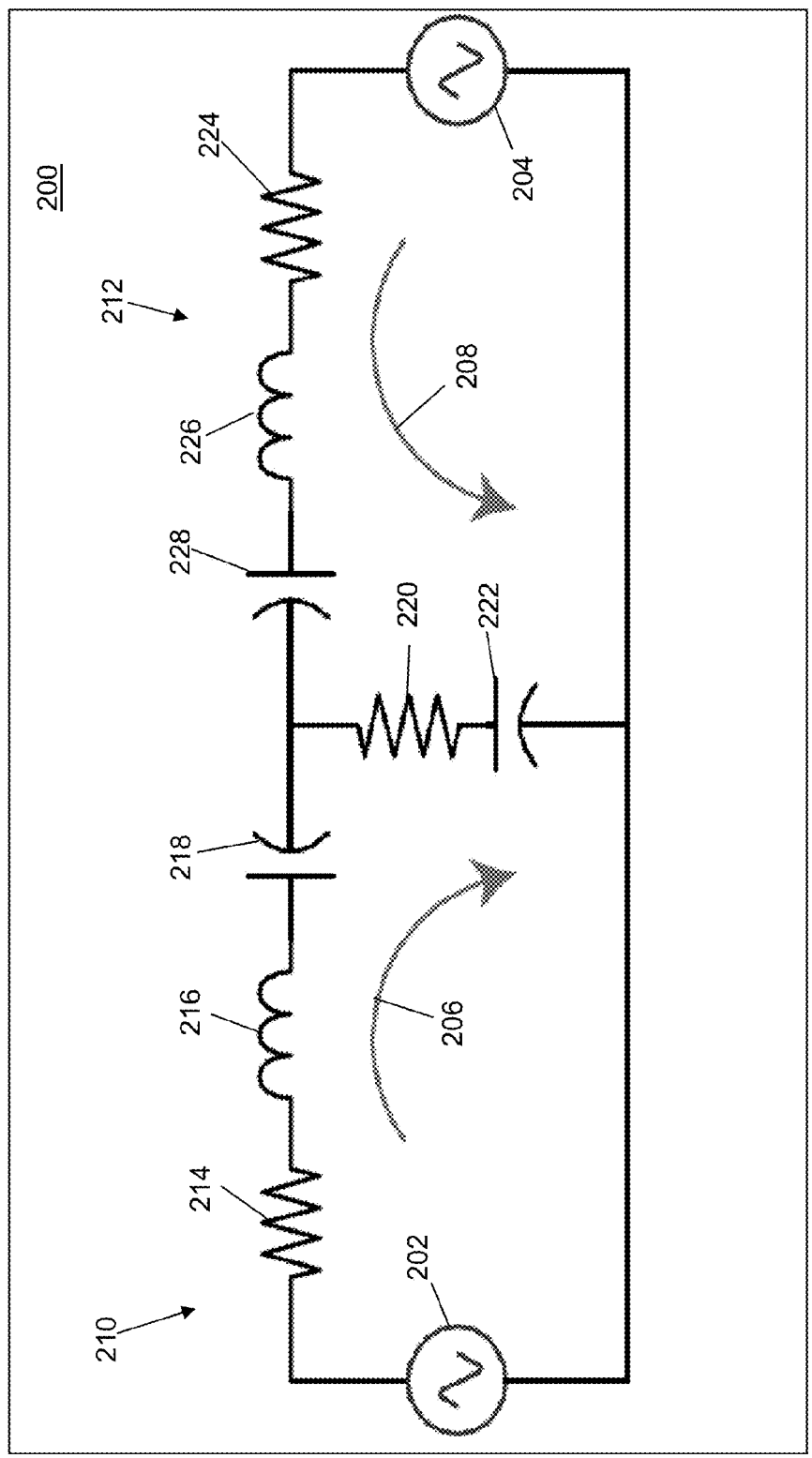
FIG. 2 depicts a first electrical circuit equivalent of the mechanical system of FIG. 1 in accordance with a first illustrative embodiment.

Using the equivalency between the basic mechanical elements (mass, damper, and spring) and electrical circuit elements (inductor, resistor, and capacitor), an electrical circuit 200 of mechanical model 100 can be derived from mechanical model 100 as shown with reference to FIG. 2. Electrical circuit 200 is obtained when considering force in a mechanical system to be analogous to voltage in an electric circuit and velocity in a mechanical system to be analogous to current. Electrical circuit 200 is a second-order coupled resonator network with a first input signal 202, $v_1(\omega)$, a second input signal 204, $v_2(\omega)$, a first output signal 206, $i_1(\omega)$, and a second output signal 208, $i_2(\omega)$. First input signal 202, $v_1(\omega)$ and second input signal 204, $v_2(\omega)$, are the input voltages, and first output signal 206, $i_1(\omega)$ and second output signal 208, $i_2(\omega)$, are the currents in each resonate loop. Because the two input signals 202, 204 of electrical circuit 200 represent the input signals at each ear, under sinusoidal excitation, the two input signals 202, 204 have the same magnitude and only a small phase difference between them caused by the difference in time of arrival of sound between the two ears. This phase difference can be expressed as $\Phi_{in}(\theta)=2\pi d \sin\theta/\lambda_{s0}$, where $d \ll \lambda_{s0}$, d is the spacing between the two ears, $\theta$ is the incidence angle, and $\lambda_{s0}$ is a free space sound wavelength.

Electrical circuit 200 may include a first resonant loop 210 and a second resonant loop 212. First resonant loop 210 may include a first resistor 214, a first inductor 216, a first capacitor 218, a second resistor 220, and a second capacitor 222. Second resonant loop 212 may include a third resistor 224, a second inductor 226, a third capacitor 228, second resistor 220, and second capacitor 222. First resistor 214, first inductor 216, and first capacitor 218 are mounted in series. Third resistor 224, second inductor 226, and third capacitor 228 are mounted in series. Second resistor 220 and second capacitor 222 are mounted in series to each other and parallel between first capacitor 218 and third capacitor 228 and couple first input signal 202 and second input signal 204 to generate first output signal 206 and second output signal 208. Thus, electrical circuit 200 includes coupled, series RLC resonant circuits.

By properly choosing the values of the circuit elements, electrical circuit 200 can be designed to increase the phase difference between the two output signals 206, 208, even though the two input signals 202, 204 are almost identical. Assuming that the two inputs are represented as $v_1=1$ and $v_2=e^{-j\Phi_{in}(\theta)}$, the outputs can be represented as $i_1=A(\theta)e^{j\Phi_1(\theta)}$ and $i_2=B(\theta)e^{j\Phi_2(\theta)}$, where $\Phi_{in}(\theta)$ represent the input phase, $A(\theta)$ and $B(\theta)$ represent the output amplitudes, and $\Phi_1(\theta)$ and $\Phi_2(\theta)$ represent the output phases. The output phase difference can be defined as $\Phi_{out})=(\theta)=\Phi_1(\theta)-\Phi_2(\theta)$.

Figure 3:
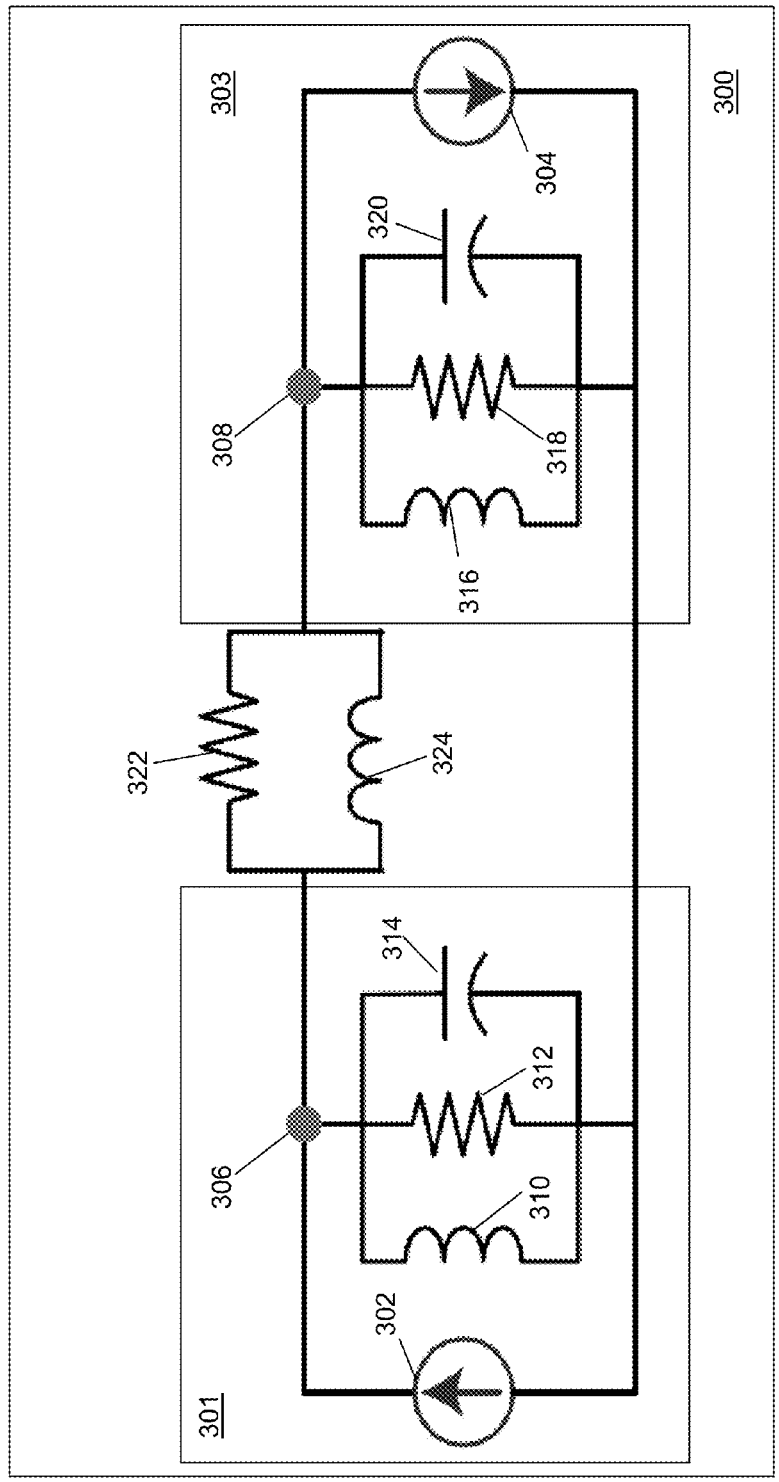
FIG. 3 depicts a second electrical circuit equivalent of the mechanical system of FIG. 1 in accordance with a second illustrative embodiment.

Using the equivalency between the basic mechanical elements (mass, damper, and spring) and electrical circuit elements (inductor, resistor, and capacitor), a second electrical circuit 300 of mechanical model 100 can be derived from mechanical model 100 as shown with reference to FIG. 3. Second electrical circuit 300 is obtained when considering force in a mechanical system to be analogous to current in an electric circuit and velocity in a mechanical system to be analogous to voltage. Second electrical circuit 300 is a coupled resonator network with a first input signal 302, $i_1(\omega)$, a second input signal 304, $i_2(\omega)$, a first output signal 306, $v_1(\omega)$, and a second output signal 308, $v_2(\omega)$. First input signal 302, $i_1(\omega)$, and second input signal 304, $i_2(\omega)$, represent the input current, and first output signal 306, $v_1(\omega)$, and a second output signal 308, $v_2(\omega)$ represent the output voltage across each parallel RLC circuit. Because the two input signals 302, 304 of second electrical circuit 300 represent the input signals at each ear, under sinusoidal excitation, the two input signals 302, 304 have the same magnitude and only a small phase difference between them caused by the difference in time of arrival of sound between the two ears. This phase difference again can be expressed as $\Phi_{in}(\theta)=2\pi d \sin\theta/\lambda_{s0}$, where $d\ll\lambda_{s0}$, d is the spacing between the two ears, $\theta$ is the incidence angle, and $\lambda_{s0}$ is a free space sound wavelength.

Second electrical circuit 300 may include a first RLC circuit 301, a second RLC circuit 303, a third resistor 322, and a third inductor 324. First RLC circuit 301 may include a first inductor 310, a first resistor 312, and a first capacitor 314. Second RLC circuit 303 may include a second inductor 316, a second resistor 318, and a second capacitor 320. First inductor 310, first resistor 312, and first capacitor 314 are mounted in parallel. Second inductor 316, second resistor 318, and second capacitor 320 are mounted in parallel. Third resistor 322 and third inductor 324 are mounted in parallel to each other and in series between first RLC circuit 301 and second RLC circuit 303 and couple first input signal 302 and second input signal 304 to generate first output signal 306 and second output signal 308. Thus, second electrical circuit 300 includes coupled, parallel RLC resonant circuits. Again, by properly choosing the values of the circuit elements, electrical circuit 300 can be designed to increase the phase difference between the two output signals 306, 308, even though the two input signals 302, 304 are almost identical.

Figure 4:
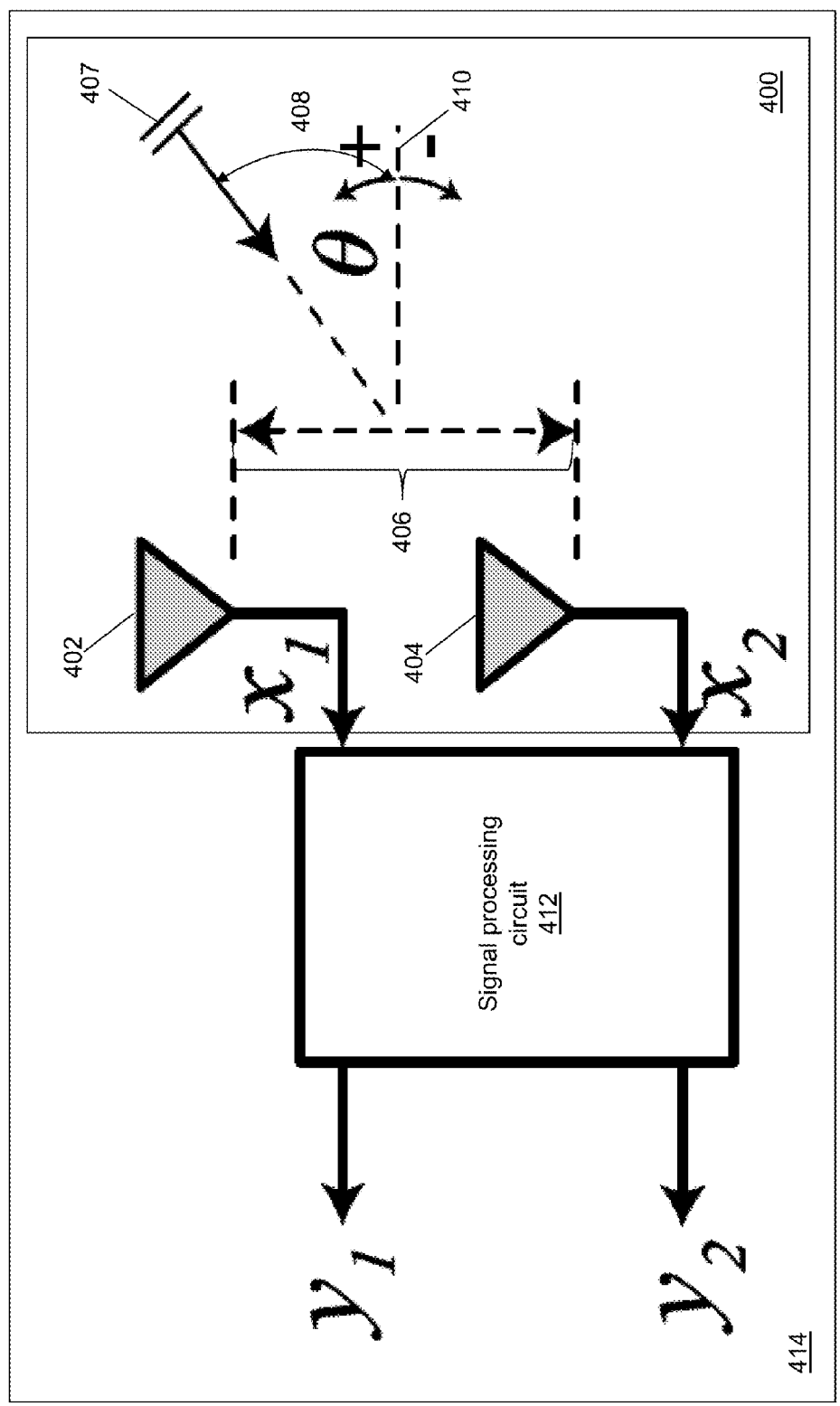
FIG. 4 depicts a block diagram of a receiver system utilizing the electrical circuit equivalent of FIG. 2 or FIG. 3 in accordance with an illustrative embodiment.

With reference to FIG. 4, a block diagram of a receiver system 414 utilizing the electrical circuit equivalent of FIG. 2 or FIG. 3 in accordance with a first illustrative embodiment is depicted. Receiver system 414 includes an antenna array 400 shown in accordance with an illustrative embodiment and a signal processing circuit 412. Antenna array 400 may include a first antenna 402 and a second antenna 404 though a fewer or a greater number of antennas may be used. First antenna 402 and second antenna 404 are separated by a distance 406, d, where $d\ll\lambda_0$. $\lambda_0$ is the free space wavelength of an incident plane electromagnetic (EM) wave received from a source 407 positioned at an incidence angle 408, $\theta$, measured relative to a boresight direction 410 of antenna array 400. $\lambda_0=c/f_0$, where c is the speed of light and $f_0$ is the carrier frequency of the incident plane electromagnetic (EM) wave. The antenna output signals $x_1$ and $x_2$ of antenna array 400 have the same magnitude and a phase difference of $\Phi_{in}(\theta)=2\pi d \sin\theta/\lambda_0$ and are input to signal processing circuit 412, which generates output signals $y_1$ and $y_2$, which have a significantly larger output phase difference, which varies as a function of incidence angle. Even if distance 406, d, is not significantly smaller than the wavelength, $\lambda_0$, signal processing circuit 412 generates output signals $y_1$ and $y_2$ having a significantly larger output phase difference. For example, if $d\ll\lambda_0/2$, signal processing circuit 412 provides a better resolution than that which is achieved using a regular array architecture without signal processing circuit 412.

To quantify this, a dimensionless quantity denoted Sensitivity Factor (SF) can be defined for antenna array 400 without and with further processing using signal processing circuit 412:

$$SF_{without}(\theta) = \left|1+\frac{x_1}{x_2}\right|^2 == |1+e^{j\Phi_{in}(\theta)}|^2 \qquad (1)$$

$$SF_{with}(\theta) = \left|1+\frac{y_1}{y_2}\right|^2 = |1+A(\theta)/B(\theta)e^{-j\Phi_{out}(\theta)}|^2 \qquad (2)$$

where $SF_{without}$ refers to the sensitivity factor of antenna array 400 without further processing using signal processing circuit 412 and $SF_{with}(\theta)$ refers to the sensitivity factor of antenna array 400 with further processing using signal processing circuit 412. The angular variations of sensitivity factor are henceforth referred to as the sensitivity pattern. The sensitivity pattern is a dimensionless quantity, which can be used as a measure for quantifying the capability of a receiving array, composed of two closely spaced isotropic antennas, in determining the direction of arrival of an incoming EM wave. $SF_{with}(\theta)$ is the ratio of the power of the two output signals $y_1(\theta)$ and $y_2(\theta)$, i.e, $SF_{with}(\theta)|_{dB}=10\log(|y_1\pm y_2|^2/|y_2|^2)$.

The sensitivity pattern is different from the traditional array factor, which is an indication of the amount of power received by an array. For antenna array 400 before processing using signal processing circuit 412, the sensitivity pattern and the normalized array factor have the same angular dependency. On the other hand, the angular variation of the sensitivity pattern after processing using signal processing circuit 412 is considerably different from those of its array factor. A comparison of equations (1) and (2) reveals that if $\Phi_{out}(\theta)$ can be approximated as a linear function of $\Phi_{in}(\theta)$ with a slope of m>1, the sensitivity pattern of antenna array 400 after processing using signal processing circuit 412 is equivalent to that of a regular two-element array with a spacing of m×d between the two elements. In other words, as far as spatial resolving capabilities of a receiving array are concerned, the effective aperture size of antenna array 400 after processing using signal processing circuit 412 is m times its maximum physical size, d. However, due to the nonlinear relationship between $\Phi_{out}(\theta)$ and $\Phi_{in}(\theta)$, this virtual aperture amplification is even more significant allowing antenna array 400 to have a sensitivity pattern equivalent to a multi-element array with significantly larger aperture dimensions and half-wavelength spacing between the elements. The outputs can be measured using receivers.

Figure 5:
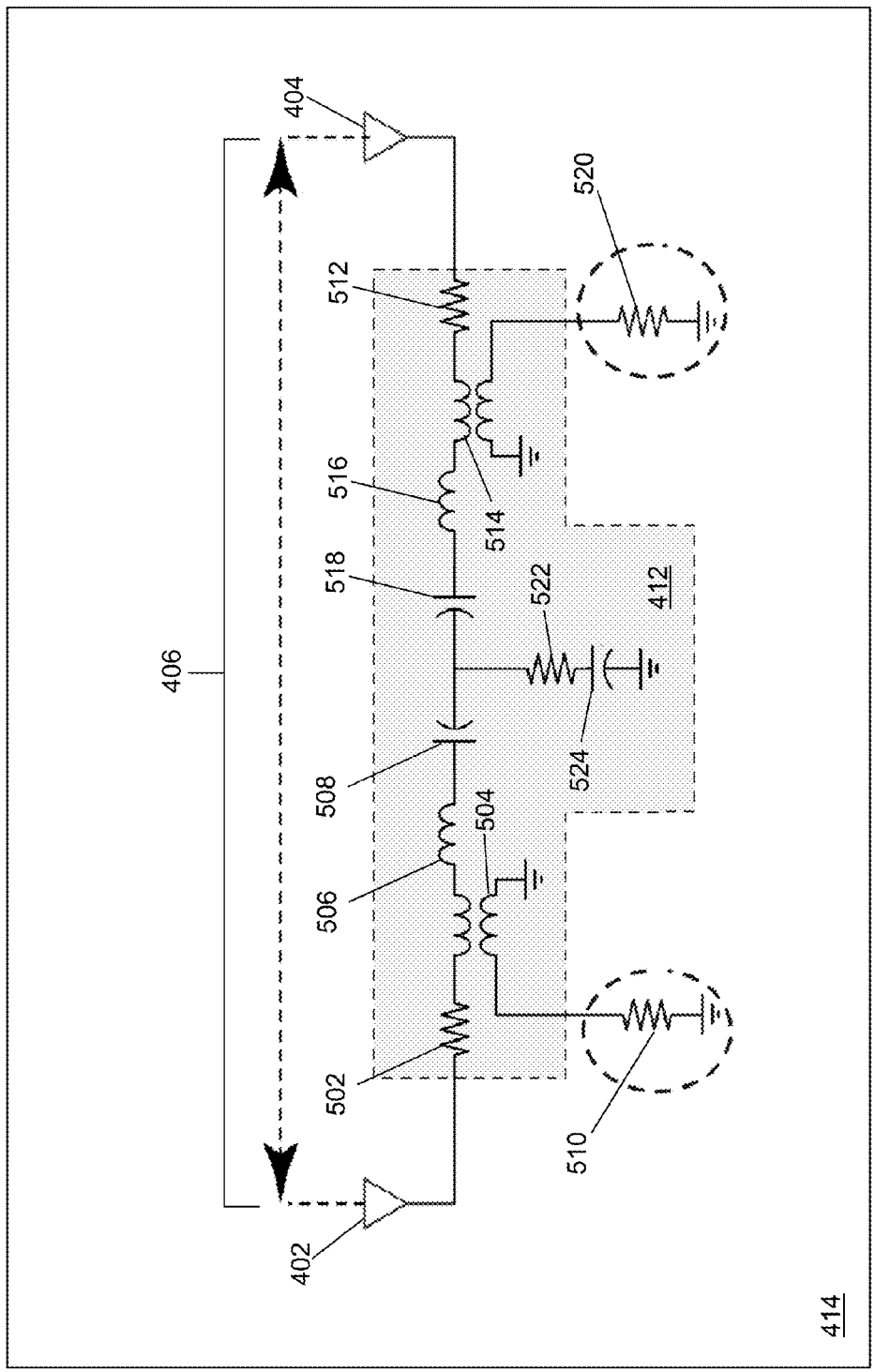
FIG. 5 depicts an electrical circuit of the receiver system of FIG. 4 in accordance with an illustrative embodiment.

With reference to FIG. 5, a schematic of receiver system 414 including signal processing circuit 412 is shown in accordance with an illustrative embodiment. Signal processing circuit 412 may be based on electrical circuit 200 or second electrical circuit 300. In the illustrative embodiment of FIG. 5, signal processing circuit 412 is based on electrical circuit 200. A first resistor 502, a first transformer 504, a first inductor 506, and a first capacitor 508 receive a first signal $x_1$ from first antenna 402. A second resistor 512, a second transformer 514, a second inductor 516, and a second capacitor 518 receive a second signal $x_2$ from second antenna 404. A third resistor 522 and a third capacitor 524 are mounted in series to each other and parallel between first capacitor 508 and second capacitor 518. Third resistor 522 and third capacitor 524 couple first signal $x_1$ received from first antenna 402 and second signal $x_2$ received from second antenna 404 such that a first output signal $y_1$ and a second output signal $y_2$ are generated as a function of first signal $x_1$ and second signal $x_2$. First output signal $y_1$ is generated across a first output resistor 510, and second output signal $y_2$ is generated across a second output resistor 520. First transformer 504 and second transformer 514 simplify the sampling of the output loop currents, and first output resistor 510 and second output resistor 520 convert the sampled output loop currents to output voltages. If signal processing circuit 412 based on second electrical circuit 300 is used, first transformer 504 and second transformer 514 are not needed.

Figure 6:
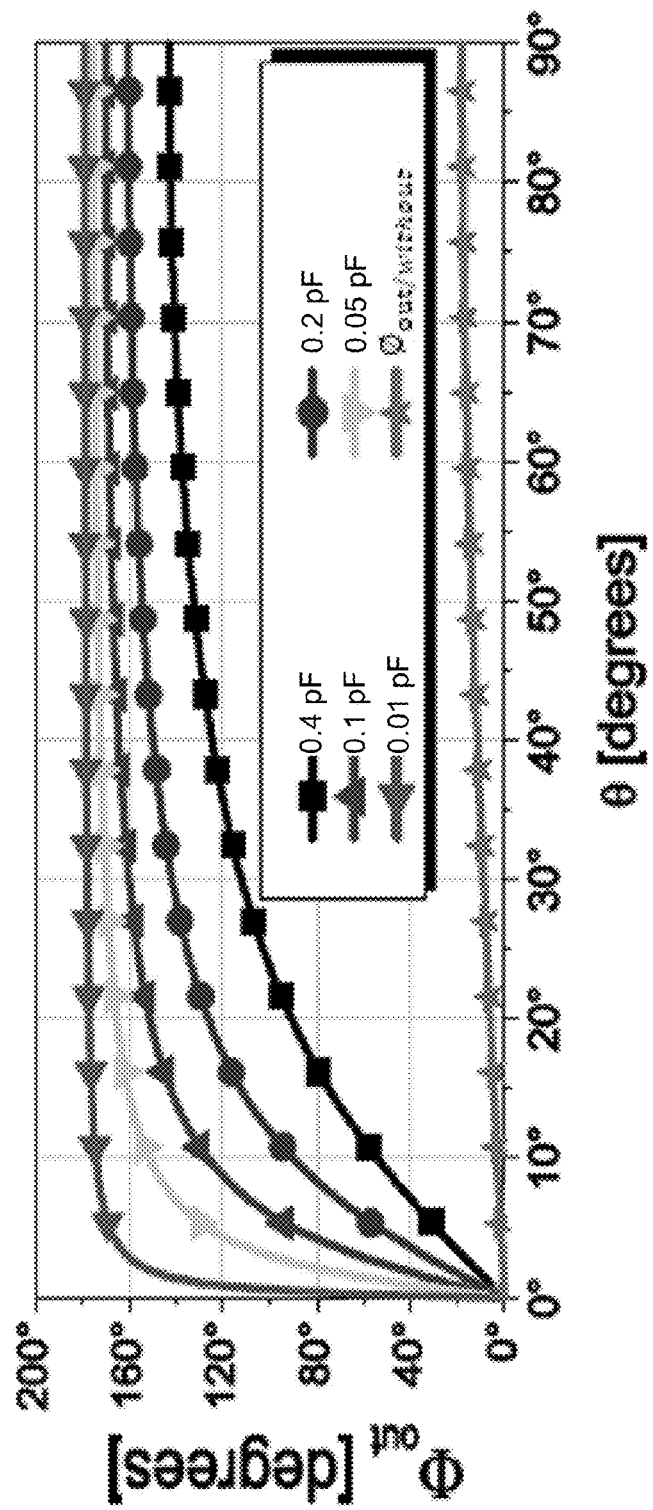
FIG. 6 depicts an output phase generated when not using the electrical circuit of FIG. 5 and generated using the electrical circuit of FIG. 5 as a function of incidence angle and for different values of coupling capacitance in accordance with an illustrative embodiment.

With reference to FIG. 6, the phase difference as a function of incidence angle 408 was calculated for antenna array 400 including first antenna 402 and second antenna 404 comprised of two isotropic receiving elements spaced $0.05\lambda_0$ apart and with $A(\theta)=B(\theta)$. First resistor 502 and second resistor 512 were defined as 1.1 Ohms ($\Omega$). Third resistor 522 was defined as $0\Omega$. First capacitor 508 and second capacitor 518 were defined as 1.75 pico Farad (pF), and first inductor 506 and second inductor 516 were defined as 82 nano Henry (nH). The values of third capacitor 524, also referenced as the coupling capacitor, were varied (0.4 pF, 0.2 pF, 0.1 pF, 0.05 pF, and 0.01 pF) to show the effect of this parameter on the output phase difference between the two output signals $y_1(\theta)$ and $y_2(\theta)$. Additionally, the phase difference between output signals $x_1$ and $x_2$ of antenna array 400 as a function of incidence angle 408 was calculated for comparison and is denoted $\Phi_{out/without}$. Adjustment of third capacitor 524 results in a change in how rapidly the phase difference saturates to a level close to 180° as incidence angle 408 increases from boresight to 90°. Thus, third capacitor 524 may be a varactor that allows adjustment of a capacitance to change a response of the phase difference as a function of incidence angle 408 of source 407.

As expected, the phase difference is significantly magnified using signal processing circuit 412. The phase difference output from signal processing circuit 412 shown in FIG. 6 has the form of an inverse tangent function, $\Phi_{out}(\theta)=2\tan^{-1}(\theta/\theta_0)$, where $\theta_0$ is a constant defined based on the circuit parameters of signal processing circuit 412. For example, $\theta_0$ varies as a function of the value of third capacitor 524 such that as the value of third capacitor 524 becomes smaller the value of $\theta_0$ becomes smaller resulting in sharper phase variations as shown with reference to FIG. 6. In contrast, $\phi_{out/without}$ has the form $2\pi d \sin\theta/\lambda_0$.

Figure 7:
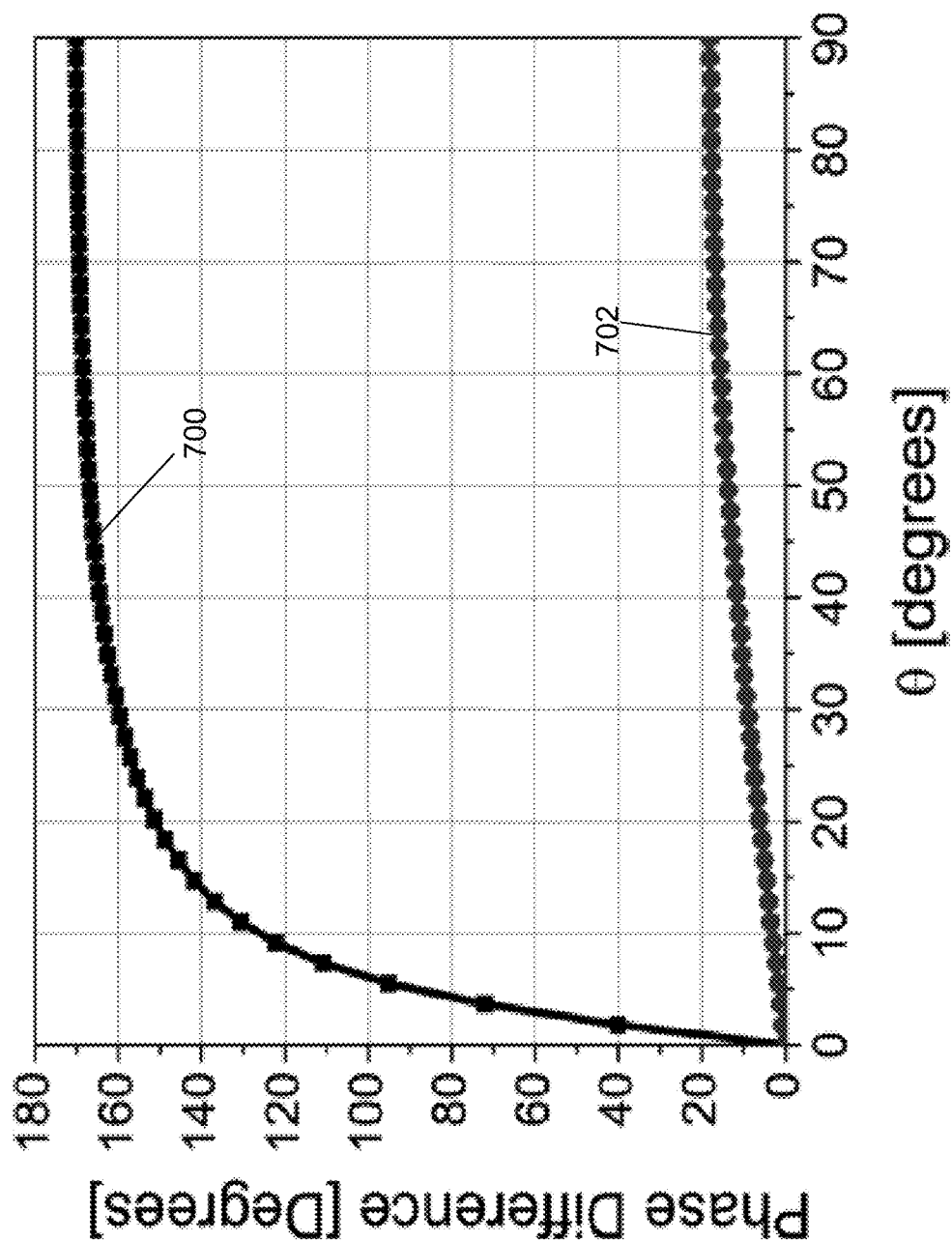
FIG. 7 depicts a phase difference comparison generated when not using the electrical circuit of FIG. 5 and generated using the electrical circuit of FIG. 5 as a function of incidence angle in accordance with an illustrative embodiment.

With reference to FIG. 7, the phase difference as a function of incidence angle 408 was calculated for antenna array 400 including first antenna 402 and second antenna 404 comprised of two isotropic receiving elements spaced $0.05\lambda_0$ apart and with $A(\theta)=B(\theta)$. First resistor 502 and second resistor 512 were defined as 1.1$\Omega$. Third resistor 522 was defined as $0\Omega$. First capacitor 508, second capacitor 518, and third capacitor 524 were defined as 0.1 pF, and first inductor 506 and second inductor 516 were defined as 82 nH. A first phase difference output curve 700 shows the output from signal processing circuit 412. Additionally, the phase difference between output signals $x_1$ and $x_2$ of antenna array 400 as a function of incidence angle 408 was calculated for comparison and is shown as a second phase difference output curve 702. Again, the phase output from signal processing circuit 412 has the form of an inverse tangent function, $\Phi_{out}(\theta)=2\tan^{-1}(\theta/\theta_0)$, and the phase difference between output signals $x_1$ and $x_2$ has the form $2\pi d \sin\theta/\lambda_0$, which is that for a regular array.

Figure 8:
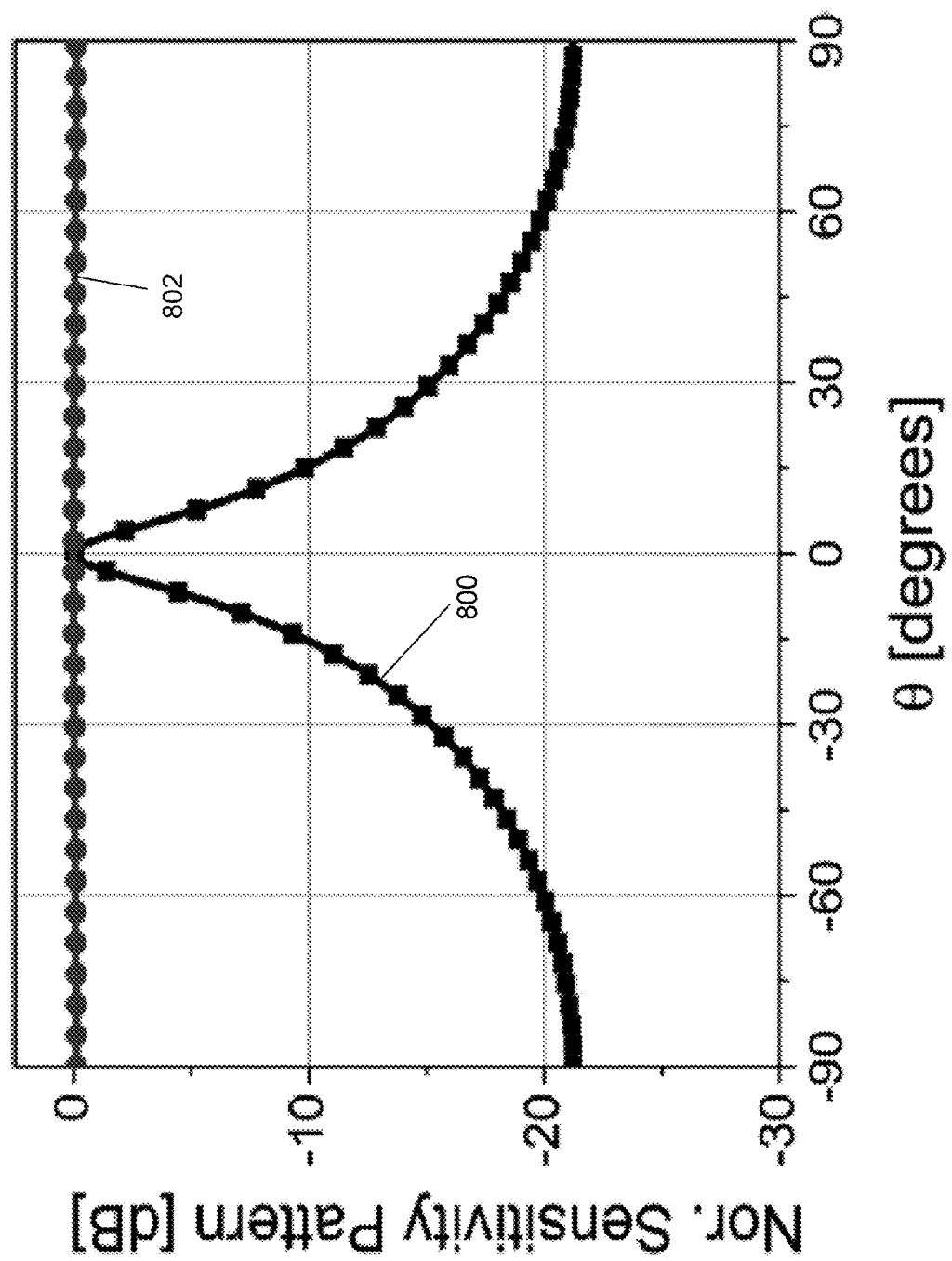
FIG. 8 depicts a normalized sensitivity pattern comparison generated when not using the electrical circuit of FIG. 5 and generated using the electrical circuit of FIG. 5 as a function of incidence angle in accordance with an illustrative embodiment.

The sensitivity pattern can be directly measured by $SF_{with}(\theta)=|y_1(\theta)+y_2(\theta)|^2/|y_2(\theta)|^2$. With reference to FIG. 8, the normalized sensitivity pattern as a function of incidence angle 408 was calculated for the antenna array described with reference to FIG. 7 and is shown by a first sensitivity pattern curve 800 output from signal processing circuit 412. For comparison, a second sensitivity pattern curve 802 for the regular array is shown. First sensitivity pattern curve 800 shows that signal processing circuit 412 provides a more directional signal.

Figure 9:
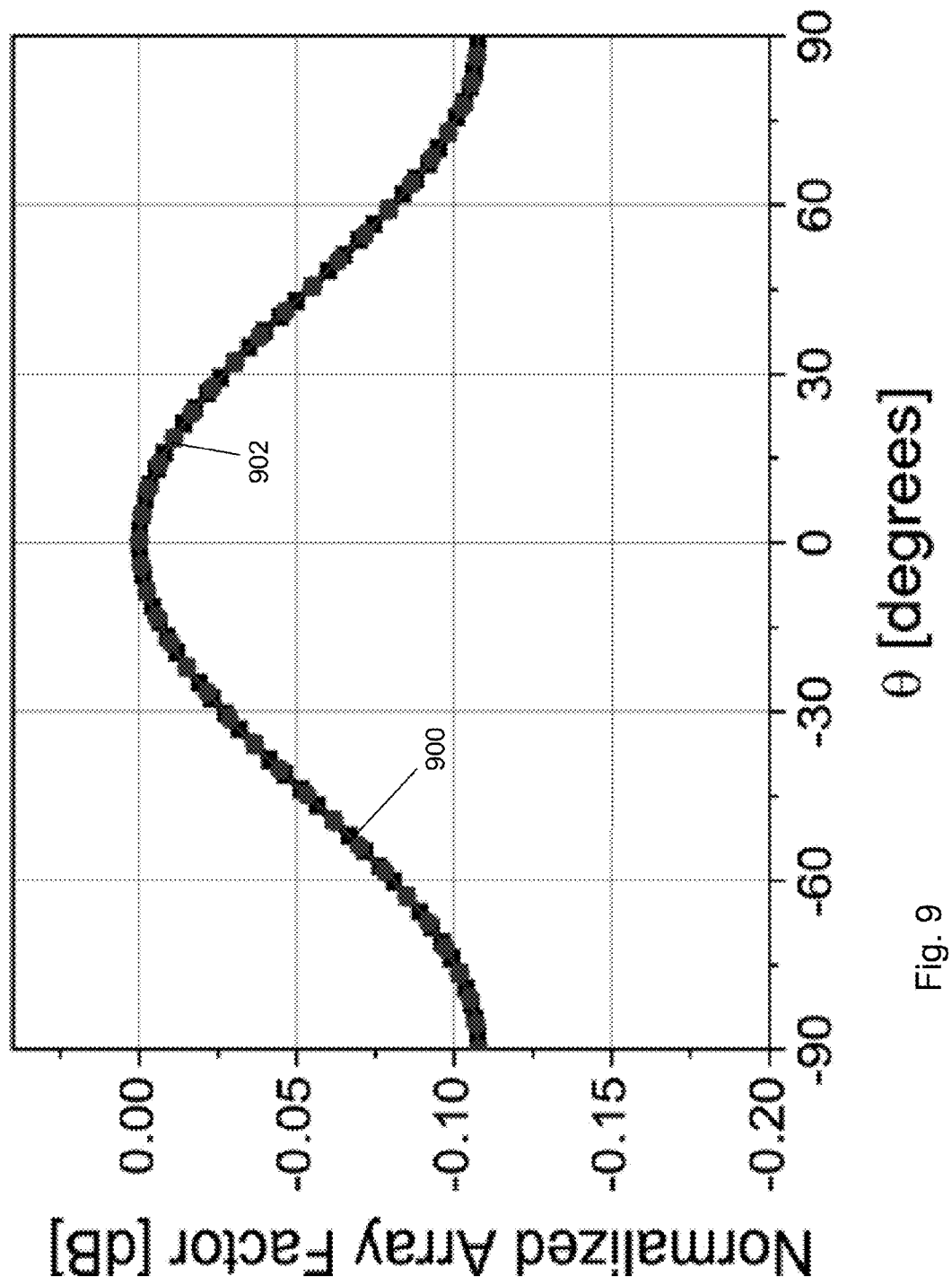
FIG. 9 depicts a normalized array factor comparison generated when not using the electrical circuit of FIG. 5 and generated using the electrical circuit of FIG. 5 as a function of incidence angle in accordance with an illustrative embodiment.

The array factor can be defined as $AF(\theta)=|y_1(\theta)+y_2(\theta)|^2$. With reference to FIG. 9, the array factor as a function of incidence angle 408 was calculated for the antenna array described with reference to FIG. 7 and is shown by a first array factor curve 900 output from signal processing circuit 412. For comparison, a second array factor curve 902 for the regular array is shown. As expected, first array factor curve 900 is identical to second array factor curve 902. Thus, the improved resolution capability provided by signal processing circuit 412 does not translate to a higher gain or directivity for the antenna array because the antennas do not collect more power from the wave compared to a normal size aperture as shown by the array factor curves 900, 902.

Figure 10:
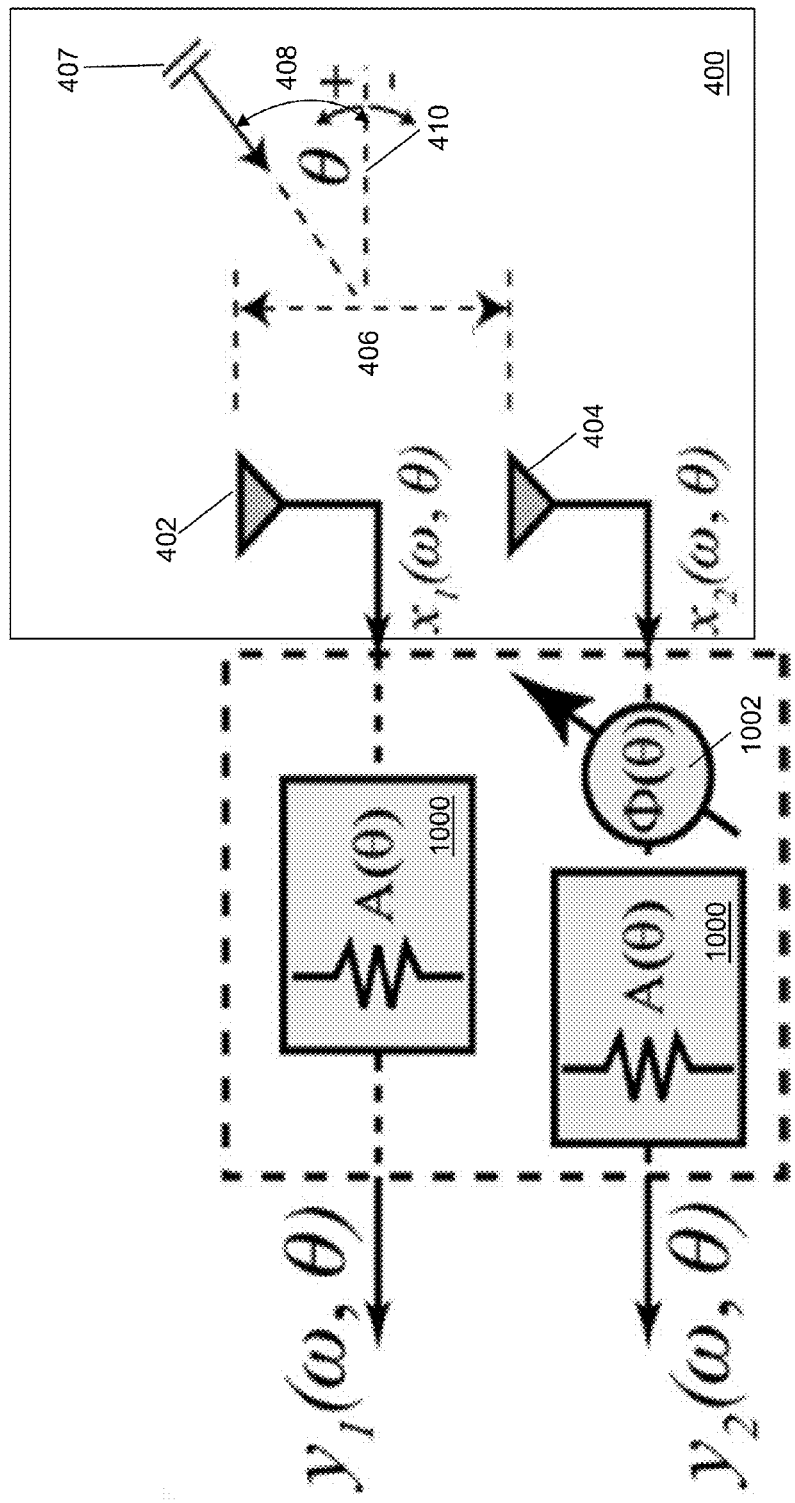
FIG. 10 depicts a block diagram of an uncoupled receiver system utilizing the electrical circuit equivalent of FIG. 2 or FIG. 3 in accordance with an illustrative embodiment.
Figure 11:
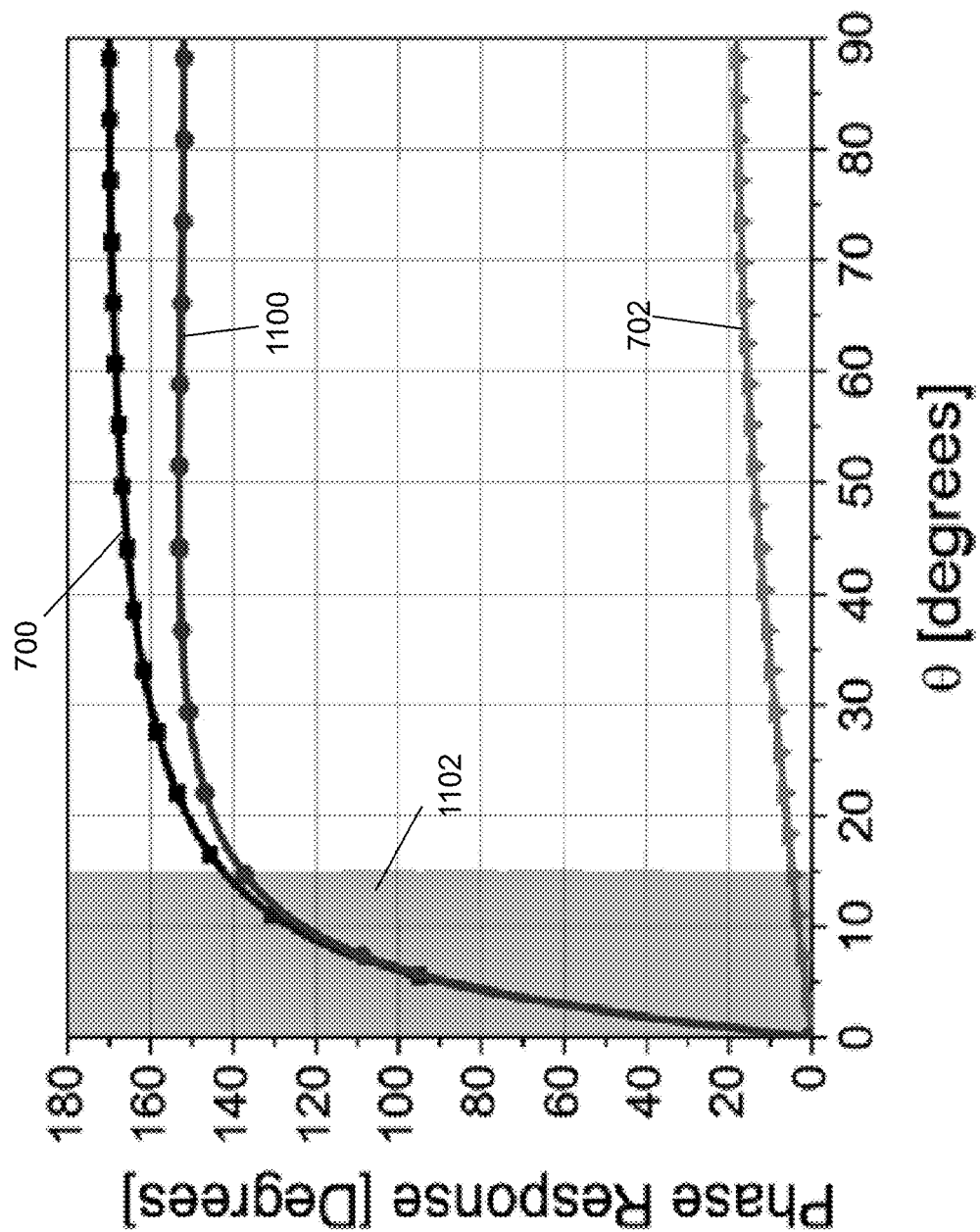
FIG. 11 depicts a phase response comparison as a function of incidence angle in accordance with an illustrative embodiment.

In evaluating the operation of receiver system 414 as an uncoupled system, signal processing circuit 412 acts as an angle of incidence (AOI) dependent attenuator 1000 and an AOI dependent phase shifter 1002 as shown with reference to FIG. 10. If AOI attenuator 1000 is absent and AOI dependent phase shifter 1002 provides a phase shift $\Phi(\theta)=m2\pi d \sin\theta/\lambda_0$, the array factor $AF=1+e^{-j2\pi(m+1)\sin(\theta)/\lambda}$. The array factor for a regular array without AOI dependent phase shifter 1002 is $AF_{without}=1+e^{-j2\pi d \sin(\theta)/\lambda}$. Thus, the effect of AOI dependent phase shifter 1002 is an aperture that has been expanded by a factor of (m+1). Inclusion of AOI dependent phase shifter 1002 effectively results in a phase response that is the difference between first phase difference output curve 700 and second phase difference output curve 702 and is shown as a third phase difference output curve 1100 as shown with reference to FIG. 11. A shaded area 1102 indicates the region of maximum sensitivity of the phase response relative to the AOI, which in the illustrative embodiment is an AOI of ~15° for two isotropic receiving elements spaced $0.05\lambda_0$.

Figure 12:
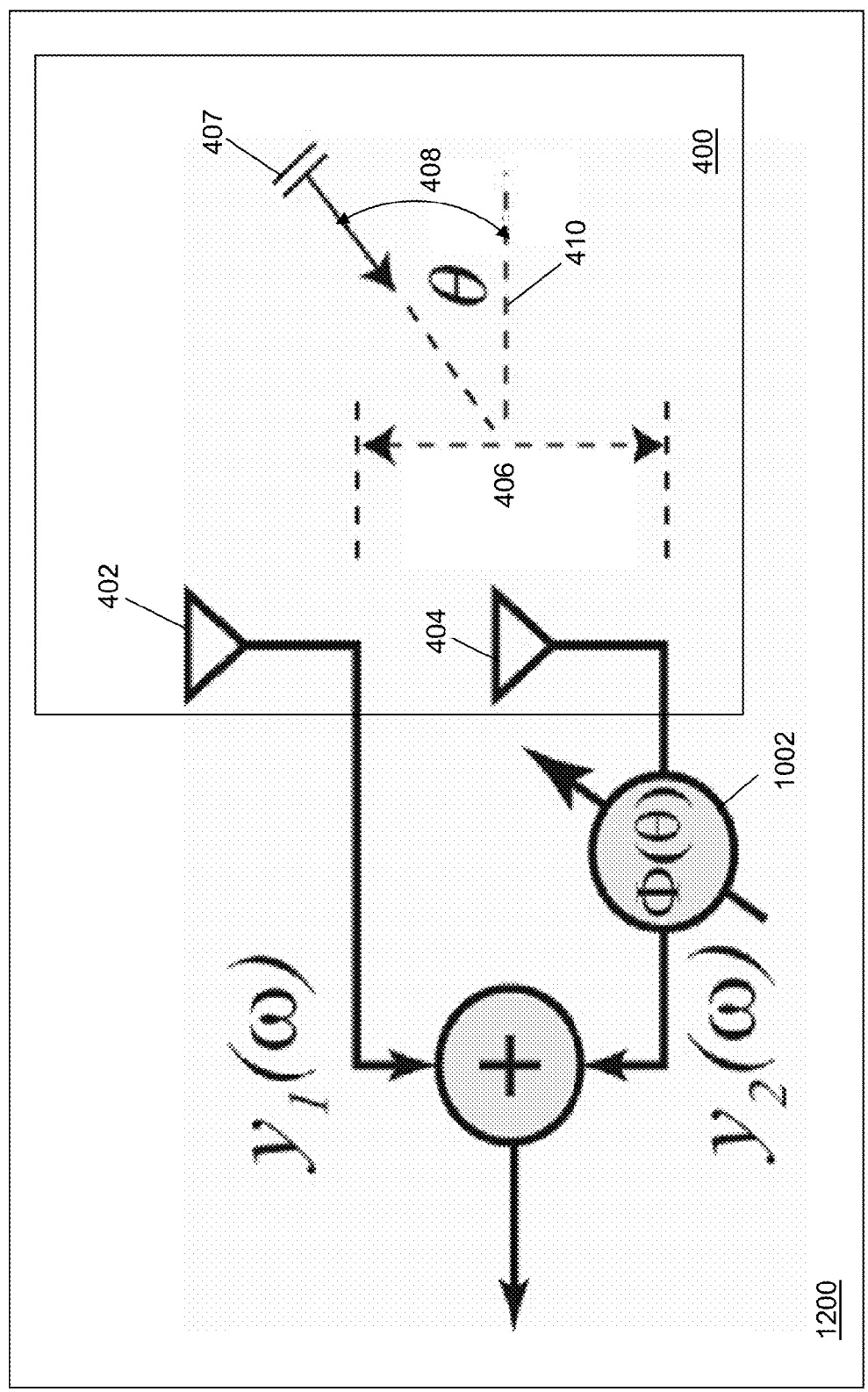
FIG. 12 depicts a block diagram of a second receiver system based on the principles of the electrical circuit equivalent of FIG. 2 or FIG. 3 in accordance with an illustrative embodiment.

Eliminating AOI dependent attenuator 1000 and including AOI dependent phase shifter 1002 into a receiver system 1200, as shown with reference to FIG. 12, thus, results in a virtual aperture expansion. As a result, receiver system 1200 has both improved resolution capability and a higher gain or directivity.

Figure 13:
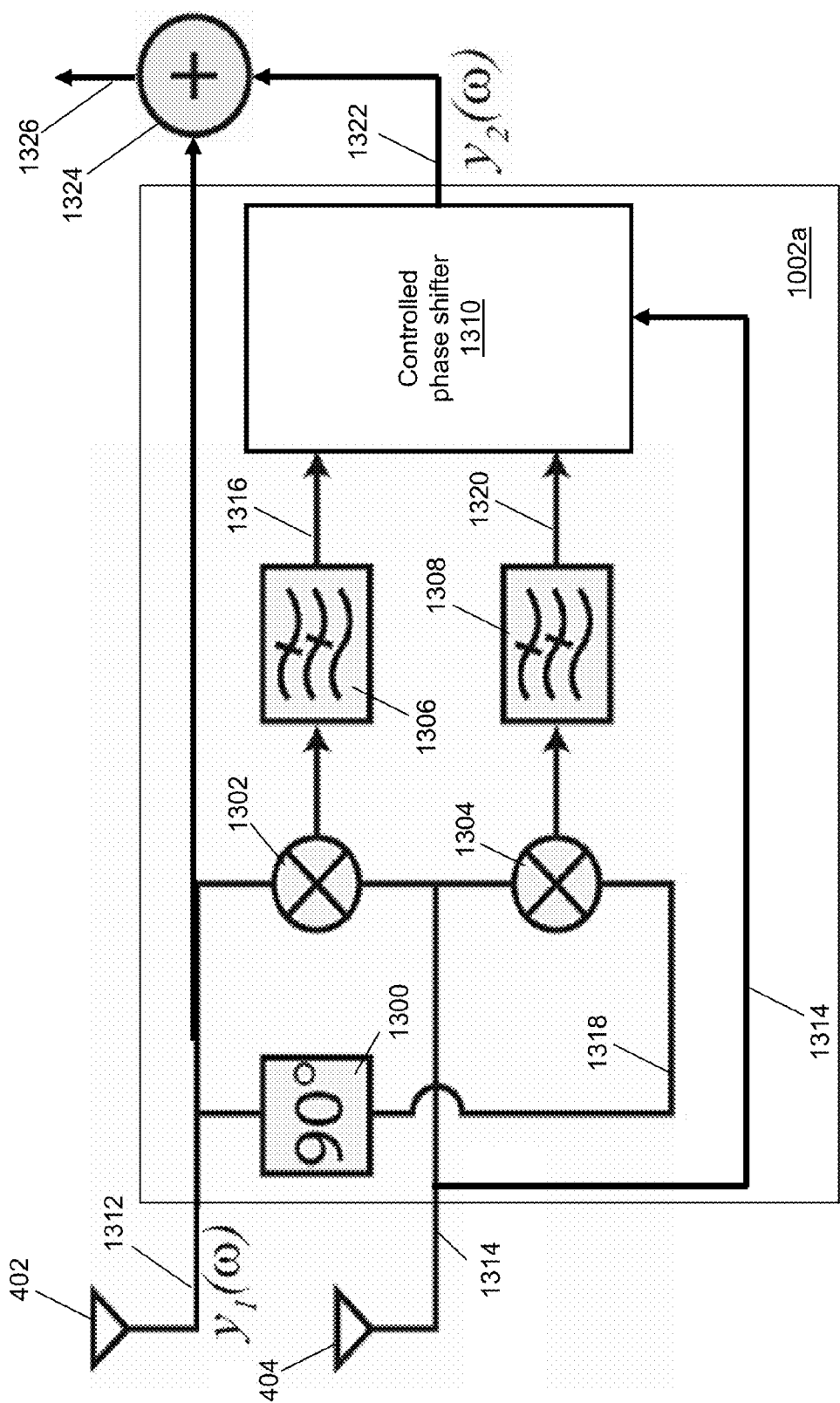
FIG. 13 depicts a block diagram of a differential phase shifter for use with the second receiver system of FIG. 12 in accordance with an illustrative embodiment.

With reference to FIG. 13, a first AOI dependent phase shifter 1002a is shown in accordance with an illustrative embodiment. First AOI dependent phase shifter 1002a may include a 90° phase shifter 1300, a first mixer 1302, a second mixer 1304, a first low pass filter 1306, a second low pass filter 1308, and a controlled phase shifter 1310. A first signal 1312 is received at first antenna 402, and a second signal 1314 is received at second antenna 404. The received signals are assumed to be plane waves that can be represented as cosine functions. Balanced amplifiers may be used so that the amplitude, A, is the same for both first signal 1312 and second signal 1314. Thus, first signal 1312 may be represented as A cos ωt, and second signal 1314 may be represented as A cos(ωt−δ), where ω is the frequency of the received signal, t is the time, and δ is the phase difference between first signal 1312 and second signal 1314. First signal 1312 and second signal 1314 are input to first mixer 1302 and the mixed signal is input to first low pass filter 1306 resulting in a first filtered signal 1316. First signal 1312 is also input to 90° phase shifter 1300 forming a shifted signal 1318. Shifted signal 1318 and second signal 1314 are input to second mixer 1304 and the mixed signal is input to second low pass filter 1308 resulting in a second filtered signal 1320. First filtered signal 1316 has the form $A^2/2 \cos(\delta)$ and second filtered signal 1320 has the form $A^2/2 \sin(\delta)$. As a result, the phase difference, δ, between first signal 1312 and second signal 1314 can be determined based on the two inputs, first filtered signal 1316 and second filtered signal 1320. The output signal from controlled phase shifter 1310 is a controlled signal 1322 denoted as $y_2(\omega)$, which is a phase shifted version of second signal 1314. First signal 1312 is $y_1(\omega)$. First signal 1312 and controlled signal 1322 are summed by a summer 1324 to form an output signal 1326 that is $y_1(\omega) + y_2(\omega)$.

Controlled phase shifter 1310 may be a voltage controlled phase shifter that applies a phase shift of either 0 or $\pm\Phi_0$ to second signal 1314 that is input to controlled phase shifter 1310. The phase shift applied is determined based on the incidence angle (also referenced herein as the angle of incidence or AOI), which is determined from the phase difference, δ, as $\theta = \sin^{-1} \lambda_0 \delta / 2\pi d$. For example, $$\Phi(\theta) = \begin{cases} -\Phi_0 & \theta < \theta_0 \\ 0 & -\theta_0 < \theta < \theta_0 \\ \Phi_0 & \theta > \theta_0 \end{cases} \quad (3)$$

where $\theta_0$ is an incidence angle threshold value and $\Phi_0$ is a phase shift threshold value. In an illustrative embodiment, $\theta_0$ is selected based on the desired beam width of the antenna's array factor as $\theta_0 = \theta_{3\ dB}/2$. For example, for a given application, an array with a beamwidth of 10° may be needed based on receiver design criteria based on the application of the receiver, which results in $\theta_0 = 5°$. Thus, the choice of $\theta_0$ depends on the desired directionality level needed from the antenna array.

Once the value of $\theta_0$ is chosen, the value of $\Phi_0$ can be determined by calculating the array factor for antenna array 400. The goal in this case is to obtain an array factor which is almost constant in the range of $-\theta_0 < \theta < \theta_0$ and has a small value outside of this range. The value of $\Phi_0$ is then chosen such that the array factor outside of this range $-\theta_0 < \theta < \theta_0$ is minimum. Thus, the value of $\Phi_0$ can be determined using basic mathematical calculations based on the desired attributes of the array factor or antenna receiving pattern as understood by a person of skill in the art.

For example, given receiver system 1200, which is a two element array, the array factor is $$AF = 1 + e^{-jkd\sin\theta} e^{-j\Phi(\theta)}$$

where $\Phi(\theta)$ is the phase shift provided by controlled phase shifter 1310 and $k = 2\pi/\lambda$ is the wavenumber. Given the goal of a directive radiation pattern in the range of $-30° < \theta < 30°$ with the direction of maximum radiation oriented towards 0° with the array factor a very small number in the region outside this. Ideally, the array factor would be zero outside the range, but this is not practical. So, instead, the array factor is minimized in the region outside the desired range. For simplicity, controlled phase shifter 1310 has three states, a phase shift of 0 or $\pm\Phi_0$. In this case, the array factor for receiver system 1200 has three different forms as shown below:

$$AF = \begin{cases} 1 + e^{-jkd\sin\theta} e^{-j\Phi_0} & \theta > 30° \\ 1 + e^{-jkd\sin\theta} & -30° < \theta < 30° \\ 1 + e^{-jkd\sin\theta} e^{j\Phi_0} & \theta < -30° \end{cases}$$

A phase shift of 0 for $-30° < \theta < 30°$ ensures that the direction of maximum radiation is toward $\theta = 0°$. Within $-30° < \theta < 30°$, receiver system 1200 behaves like a regular array with a spacing of d. Outside of this region, the array factor is modified by having a phase shift of either $\Phi_0$ or $-\Phi_0$. $\Phi_0$ is selected to minimize the amplitude of $|1 + e^{-jkd\sin\theta} e^{-j\Phi_0}|$ within the angular range $\theta > 30°$ or $|1 + e^{-jkd\sin\theta} e^{j\Phi_0}|$ within the angular range of $\theta < -30°$ using a computing device including a handheld calculator.

Figure 14:
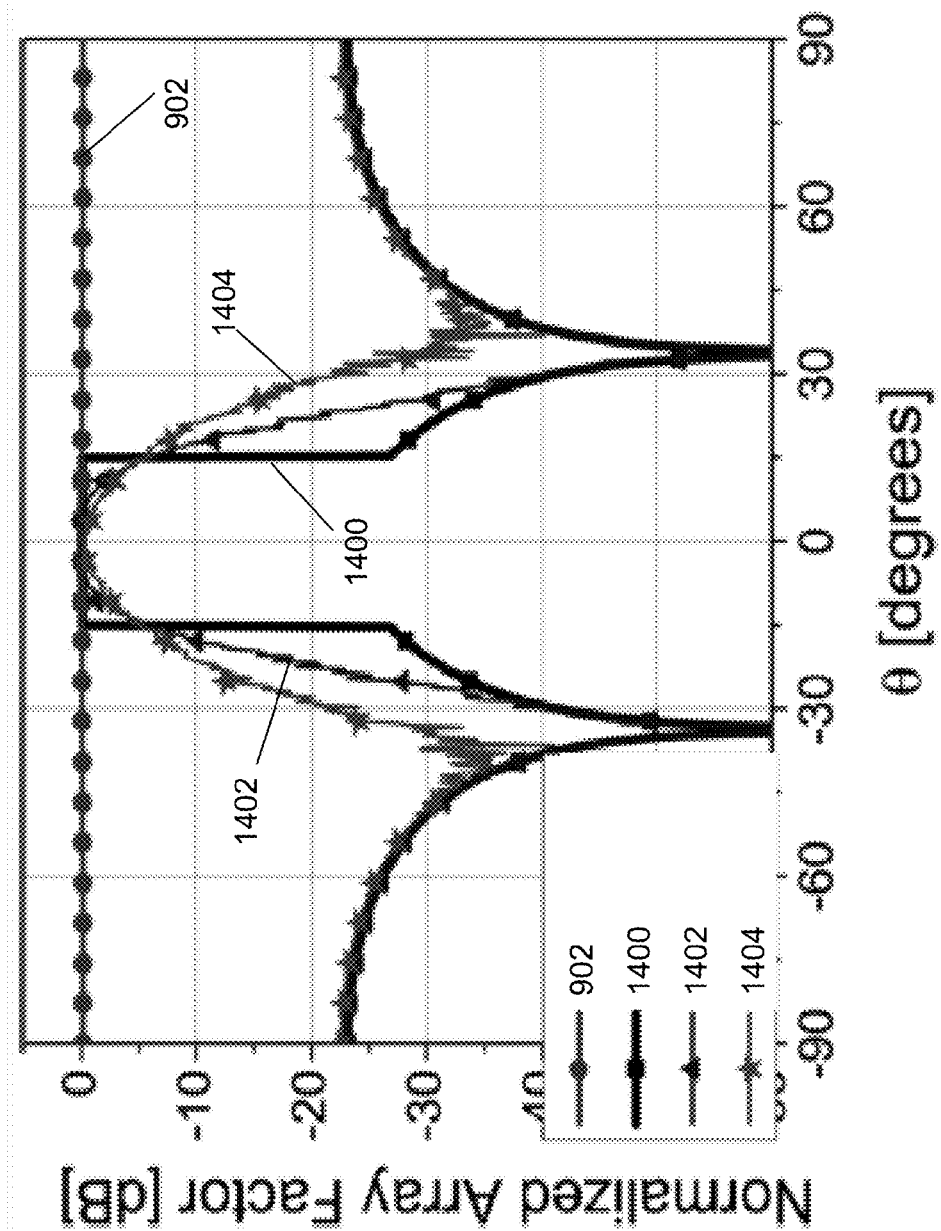
FIG. 14 depicts a normalized array factor comparison generated by a regular array and generated using the second receiver system of FIG. 12 with statistical errors as a function of incidence angle in accordance with a first illustrative embodiment.

For example, for two isotropic receiving elements spaced $0.05\lambda_0$ apart, a comparison between the normalized array factor is shown with reference to FIG. 14. A third array factor curve 1400 shows the array factor as a function of AOI, θ, calculated based on applying a phase shift according to equation (3) using controlled phase shifter 1310. $\theta_0$ is chosen to be 15°, which is half the desired beam width of 30°. In the case of this example, this process results in an optimum value of $\Phi_0 = 170°$, which minimizes the antenna's array factor outside of $-\theta_0 < \theta < \theta_0$.

Third array factor curve 1400 assumes an accurate determination of $\theta_0$. If a standard deviation error of 5° is applied to the determination of $\theta_0$ for 100 samples, the statistical average of the array factor is shown in FIG. 14 by a fourth array factor curve 1402. If a standard deviation error of 10° is applied to the determination of $\theta_0$ for 100 samples, the statistical average of the array factor is shown in FIG. 14 by a fifth array factor curve 1404. Second array factor curve 902 for the regular array is shown for comparison in FIG. 14. As expected, the array factor that results from application of a phase shift according to equation (3) using controlled phase shifter 1310 results in a substantially more directive receiver system.

Figure 15:
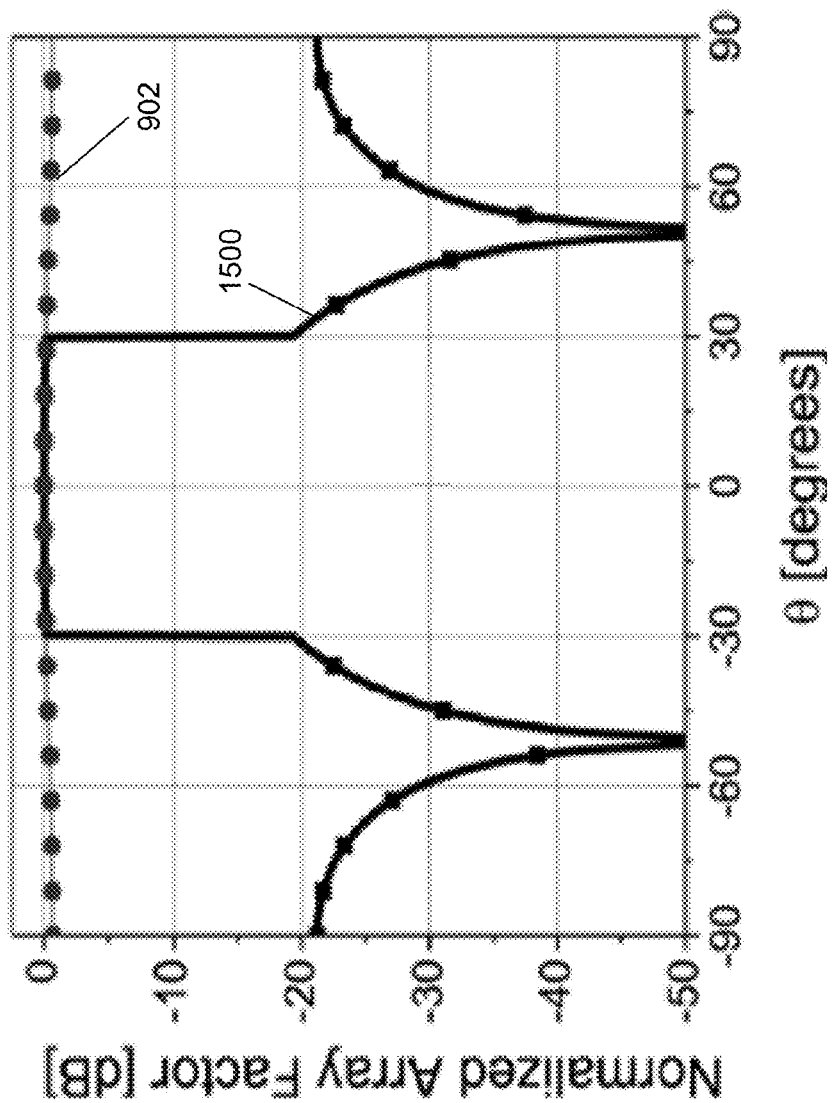
FIG. 15 depicts an idealized normalized array factor comparison generated by a regular array and generated using the second receiver system of FIG. 12 as a function of incidence angle in accordance with a second illustrative embodiment.
Figure 16:
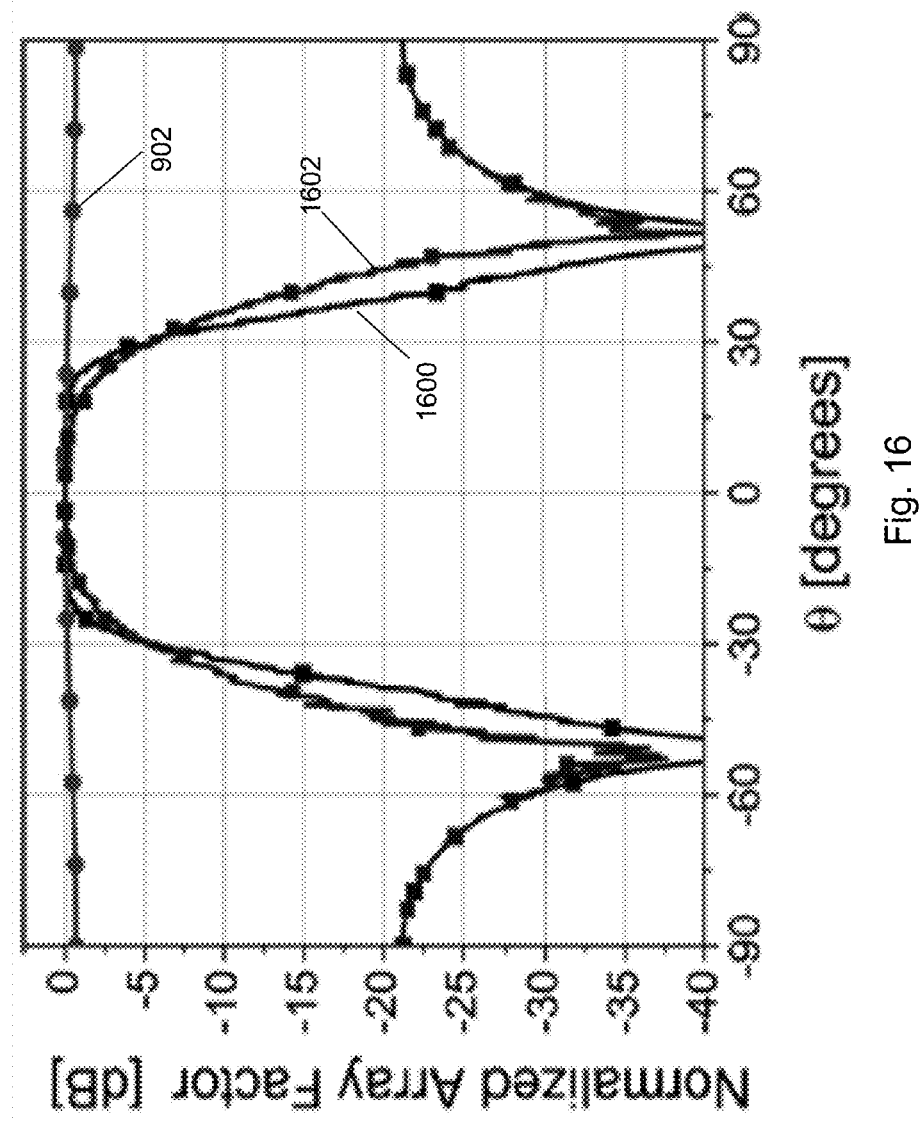
FIG. 16 depicts a normalized array factor comparison generated by a regular array and generated using the second receiver system of FIG. 12 with statistical errors as a function of incidence angle in accordance with the second illustrative embodiment.

As another example, for two isotropic receiving elements spaced $\lambda_0/8$ apart, a comparison between the normalized array factor is shown with reference to FIG. 15. A sixth array factor curve 1500 shows the array factor as a function of AOI, θ, calculated based on applying a phase shift according to equation (3) using controlled phase shifter 1310. A beam width of 60° is chosen resulting in $\theta_0 = 30°$. $\Phi_0$ is determined to be 145° because $\Phi_0 = 145°$ is found to be optimum to ensure that antenna array 400 is directional. Sixth array factor curve 1500 assumes an accurate determination of $\theta_0$. If a standard deviation error of 5° is applied to the determination of $\theta_0$ for 100 samples, the statistical average of the array factor is shown in FIG. 16 by a seventh array factor curve 1600. If a standard deviation error of 10° is applied to the determination of $\theta_0$ for 100 samples, the statistical average of the array factor is shown in FIG. 16 by an eighth array factor curve 1602. Second array factor curve 902 for the regular array is shown for comparison in FIGS. 15 and 16.

Figure 17:
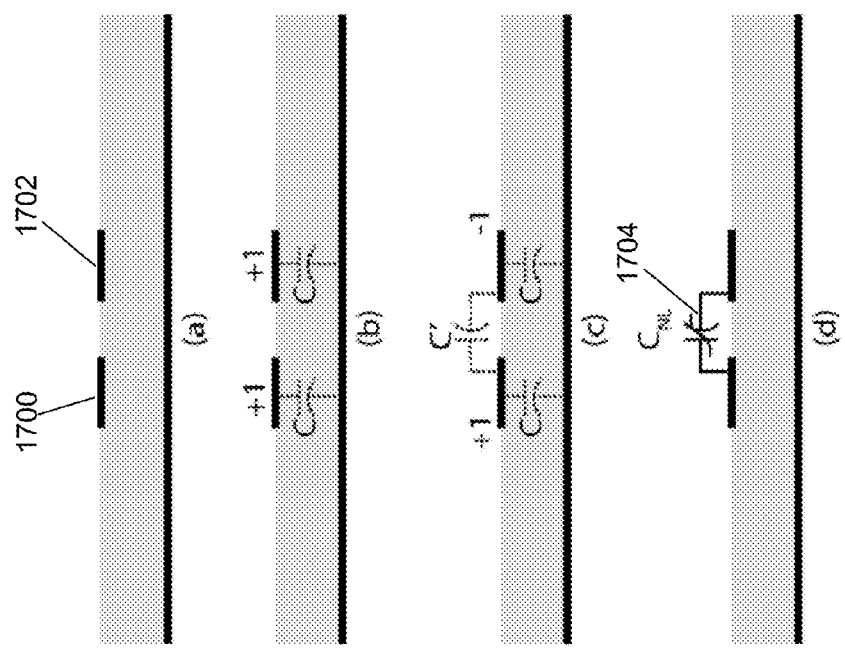
FIGS. 17a-17d depict coupled microstrip lines in accordance with an illustrative embodiment.

As an alternative to first AOI dependent phase shifter 1002a, a second AOI dependent phase shifter 1002b (shown with reference to FIG. 18) can be used. Second AOI dependent phase shifter 1002b exploits the difference between even and odd mode phase velocities of differential microwave circuits. With reference to FIG. 17(a), a side view of a first microstrip line 1700 and a second microstrip line 1702 are shown. First microstrip line 1700 and second microstrip line 1702 are coupled to each other. If both first microstrip line 1700 and second microstrip line 1702 are excited with the same voltage (+1 and +1), hence in the even mode, as shown with reference to FIG. 17(b), first microstrip line 1700 and second microstrip line 1702 have the same effective capacitance per unit length as indicated by C with reference to FIG. 17(b). If one of first microstrip line 1700 and second microstrip line 1702 is excited with an excitation coefficient of +1 and the other of first microstrip line 1700 and second microstrip line 1702 is excited with an excitation coefficient of −1, hence in the odd mode, there is an additional capacitance per unit length C' between the two lines as shown with reference to FIG. 17(c). This means that the phase velocity of the line in the even mode is different than that of the line in the odd mode. This different phase velocity can be exploited to design second AOI dependent phase shifter 1002b, which provides a total phase shift that is a function of the phase difference between the two excitation signals. Again, of course, the incidence angle is a function of the phase difference. Thus, second AOI dependent phase shifter 1002b provides a total phase shift that is a function of the incidence angle.

A mechanism for doing this is shown with reference to FIG. 17(d). In FIG. 17(d), a nonlinear capacitor 1704 is used to periodically load first microstrip line 1700 and second microstrip line 1702 along their lengths. Nonlinear capacitor 1704 serves two purposes. First, nonlinear capacitor 1704 allows a change in the phase velocity of the odd mode and achieves a desired phase velocity difference between the even and odd modes (i.e., different phase shifts per unit length). This phase velocity determines the overall phase shift that is introduced to the signal which is passed through the line. Second, the nonlinear nature of nonlinear capacitor 1704 means that the exact value of the capacitance depends on the voltage difference between the two transmission lines.

For example, there are a number of types of different nonlinear capacitors that can be used for this application. One example is a BST capacitor which has a nonlinear capacitance function of the type:

$$C = \frac{C_0}{\left(1 + \left(\frac{V}{V_0}\right)^2\right)^{1/3}}$$

where $C_0$ is a fixed capacitance value that is the capacitance when the voltage difference is zero. $V_0$ is a threshold voltage value that can be dependent on the type and composition of the materials used and the exact topology of the capacitor. C is the device's capacitance at a given voltage and V is the applied voltage at the capacitor's two terminals.

Figure 18:
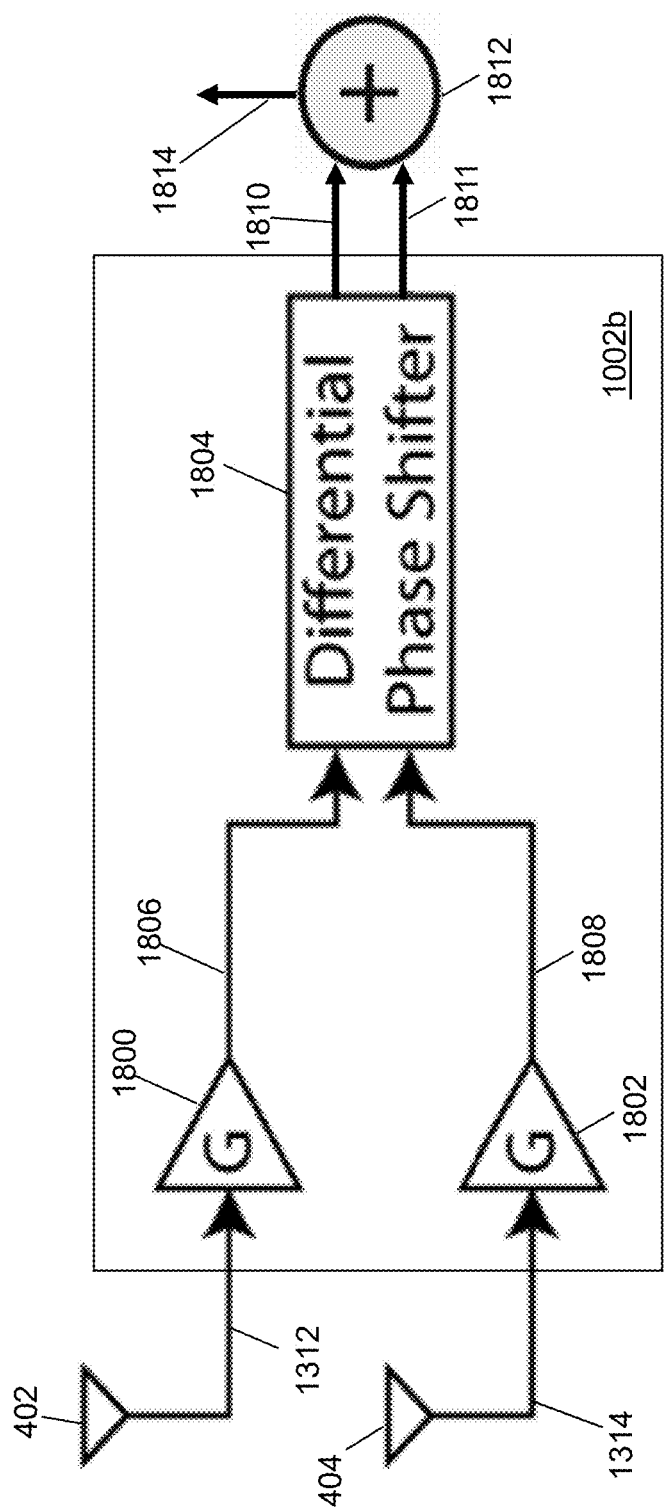
FIG. 18 depicts a block diagram of a third receiver system based on the principles of the electrical circuit equivalent of FIG. 2 or FIG. 3 in accordance with an illustrative embodiment.

With reference to FIG. 18, second AOI dependent phase shifter 1002b may include a first amplifier 1800, a second amplifier 1802, and a differential phase shifter 1804. Differential phase shifter 1804 may include first microstrip line 1700, second microstrip line 1702, and nonlinear capacitor 1704. First signal 1312 is received at first antenna 402 and amplified by first amplifier 1800 to form a first amplified signal 1806. Second signal 1314 is received at second antenna 404 and amplified by a second amplifier 1802 to form a second amplified signal 1808. First amplifier 1800 and second amplifier 1802 boost the level of first signal 1312 and second signal 1314 to ensure that the nonlinear effect of nonlinear capacitor 1704 is significant enough. If the direction of arrival of the signal is away from boresight 410, the outputs of first amplifier 1800 and second amplifier 1802 contain both even mode and odd mode signals. The level of the odd mode signal increases as the incidence angle increases. Thus, second AOI dependent phase shifter 1002b provides a phase shift that is a function of the amplitude of the odd mode signal, which is a function of the angle of incidence of the electromagnetic wave.

First amplified signal 1806 and second amplified signal 1808 are input to differential phase shifter 1804. Differential phase shifter 1804 provides a different phase shift for the common mode and the differential mode. So, when first amplified signal 1806 and second amplified signal 1808 are fed to differential phase shifter 1804, both first amplified signal 1806 and second amplified signal 1808 receive a phase shift. As a result, differential phase shifter 1804 forms a first output signal 1810, denoted $y_1(\omega)$, that is a phase shifted version of first amplified signal 1806 and a second output signal 1811, denoted $y_2(\omega)$, that is a phase shifted version of second amplified signal 1808.

First microstrip line 1700 is coupled to receive first amplified signal 1806, and first output signal 1810 is the resulting signal that propagates through first microstrip line 1700. Second microstrip line 1702 is coupled to receive second amplified signal 1808, and second output signal 1811 is the resulting signal that propagates through second microstrip line 1702. Nonlinear capacitor 1704 couples first microstrip line 1700 and second microstrip line 1702 along their lengths. First output signal 1810 and second output signal 1811 are summed by a summer 1812 to form an output signal 1814 that is $y_1(\omega) + y_2(\omega)$.

Second AOI dependent phase shifter 1002b can be used in the RF path or in the RF path after the two signals have been down converted to an intermediate frequency (IF). Since the intermediate frequency signal is usually at a significantly lower frequency compared to the RF signal, high quality components can be used to implement second AOI dependent phase shifter 1002b.

Figure 19:
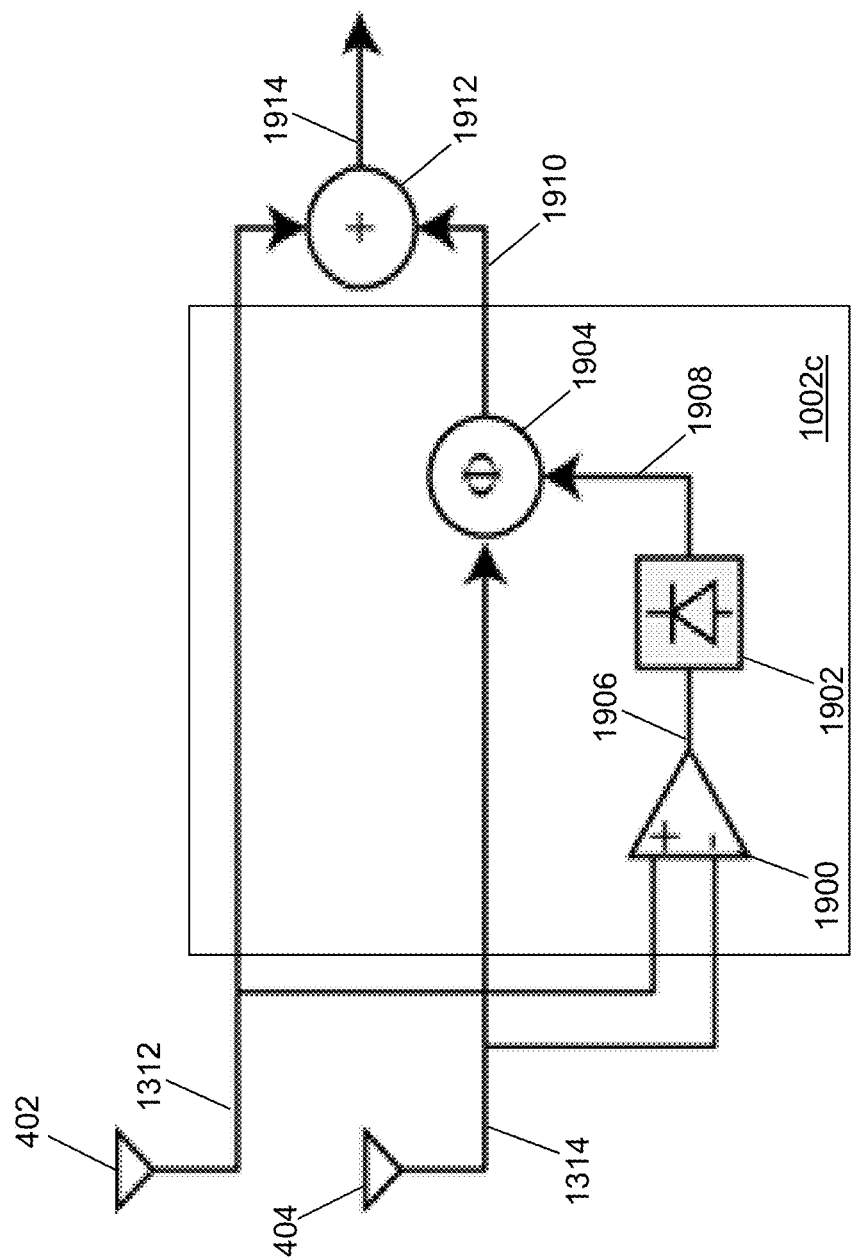
FIG. 19 depicts a block diagram of a fourth receiver system based on the principles of the electrical circuit equivalent of FIG. 2 or FIG. 3 in accordance with an illustrative embodiment.

With reference to FIG. 19, a third AOI dependent phase shifter 1002c is shown in accordance with an illustrative embodiment. Third AOI dependent phase shifter 1002c may include a differential amplifier 1900, an amplitude detector 1902, and a voltage controlled phase shifter 1904. First signal 1312 is received at first antenna 402, and second signal 1314 is received at second antenna 404. First signal 1312 and second signal 1314 are input to differential amplifier 1900 to form an amplified differential signal 1906. Amplified differential signal 1906 is input to amplitude detector 1902 where it is rectified and converted to DC to form a rectified differential signal 1908. Rectified differential signal 1908 is input to voltage controlled phase shifter 1904 and used as a control signal to control voltage controlled phase shifter 1904. The output signal from voltage controlled phase shifter 1904 is a controlled signal 1910 denoted as $y_2(\omega)$, which is a phase shifted version of second signal 1314. First signal 1312 and controlled signal 1910 are summed by a summer 1912 to form an output signal 1914 that is $y_1(\omega) + y_2(\omega)$.

As the incidence angle of second signal 1314 (or first signal 1312) increases, the difference between first signal 1312 and second signal 1314 also increases. As a result, the output of differential amplifier 1900 increases and rectified differential signal 1908 changes. Because rectified differential signal 1908 is a function of the incidence angle of second signal 1314, the response of voltage controlled phase shifter 1904 is also a function of the incidence angle of second signal 1314. Therefore, third AOI dependent phase shifter 1002c acts as a single phase shifter that provides a phase shift that is a function of the incidence angle of second signal 1314.

Figure 20:
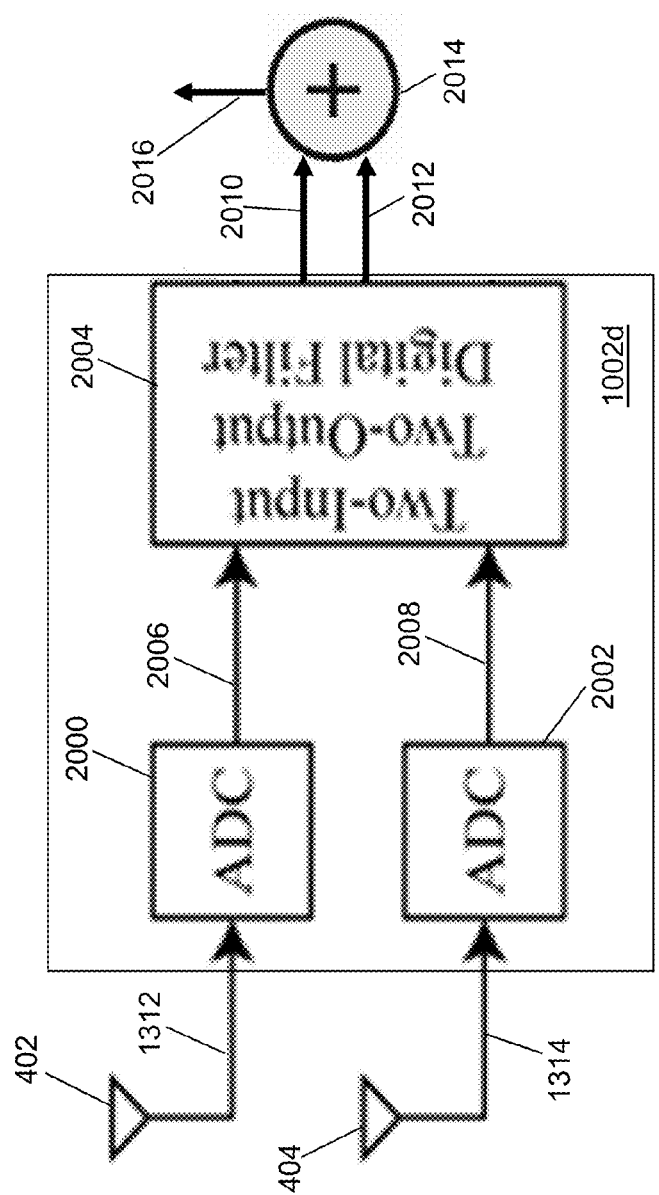
FIG. 20 depicts a block diagram of a fifth receiver system based on the principles of the electrical circuit equivalent of FIG. 2 or FIG. 3 in accordance with an illustrative embodiment.

With reference to FIG. 20, a fourth AOI dependent phase shifter 1002d is shown in accordance with an illustrative embodiment. Fourth AOI dependent phase shifter 1002d may include a first analog-to-digital converter (ADC) 2000, a second ADC 2002, and a digital filter 2004. First ADC 2000 and second ADC 2002 may be high speed ADCs. First signal 1312 is received at first antenna 402, and second signal 1314 is received at second antenna 404. First signal 1312 is input to first ADC 2000, which converts first signal 1312 to a first digital signal 2006. Second signal 1314 is input to second ADC 2002, which converts second signal 1314 to a second digital signal 2008. First digital signal 2006 and second digital signal 2008 are input to digital filter 2004. Digital filter 2004 may be a two-input, two-output digital filter configured to provide the phase response illustrated by third phase difference output curve 1100 shown with reference to FIG. 11.

The response of the system model shown in FIG. 10 is described with two linear differential equations. Similarly, if the AOI dependent attenuators are removed from the block diagram shown in FIG. 10, the response of the resulting system is also represented with a system of two linear differential equations. In all of the implementations that we have discussed so far, the system of two differential equations was represented using analog components (mixers, phase shifters, detectors, amplifiers, etc.). However, once the data is available digitally, the desired system response can be implemented mathematically by digital filter 2004 to generate a first filtered signal 2010 and a second filtered signal 2012. First filtered signal 2010 and second filtered signal 2012 have the same amplitude, but digital filter 2004 may provide an output phase difference $\Phi(\theta)=m2\pi d \sin\theta/\lambda$. First filtered signal 2010 and second filtered signal 2012 are summed by a summer 2014 to form an output signal 2016 that is $y_1(\omega)+y_2(\omega)$.

As another example, digital filter 2004 may provide an output phase difference $$\Phi(\theta) = 2\tan^{-1}\left(\frac{\theta}{\theta_{3dB}}\right) - 2\pi d \sin\theta/\lambda$$

where $\theta_{3\,dB}$ is the desired 3 dB beamwidth and $2\pi d \sin\theta/\lambda$ is the phase difference between two signals received by two closely spaced antennas with a spacing of d between them and d<<λ, which results in third phase difference output curve 1100.

With reference to FIG. 20, first signal 1312 and second signal 1314 are converted to digital signals directly. In alternative embodiments, first signal 1312 and second signal 1314 may first be processed by an RF front end and converted to a lower intermediate frequency signal after which the signals are sampled and converted to digital signals before input to digital filter 2004.

As used in this disclosure, the term "mount" includes join, unite, connect, associate, insert, hang, hold, affix, attach, fasten, bind, paste, secure, bolt, screw, rivet, solder, weld, glue, form over, layer, etch, and other like terms. The phrases "mounted on" and "mounted to" include any interior or exterior portion of the element referenced. As used herein, the mounting may be a direct mounting between the referenced components or an indirect mounting through intermediate components between the referenced components.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A receiver system comprising:
   a plurality of antennas comprising
   a first antenna configured to receive a first signal; and
   a second antenna configured to receive a second signal; and
   a signal processing circuit comprising a phase shifter configured to apply a phase shift to the received second signal, wherein the phase shift applied by the phase shifter is a function of an angle of incidence of the second signal measured relative to a boresight direction of the plurality of antennas,
   wherein the signal processing circuit is configured to form an output signal that includes the phase shifted second signal.

2. The receiver system of claim 1, wherein the phase shifter is controlled by a phase difference determined between the received first signal and the received second signal.

3. The receiver system of claim 2, further comprising:
   a ninety degree phase shifter configured to receive the received first signal and to form a phase shifted first signal;
   a first mixer configured to receive the received first signal and the received second signal and to form a first mixed signal;
   a second mixer configured to receive the received second signal and the phase shifted first signal and to form a second mixed signal;
   a first low pass filter configured to receive the first mixed signal and to form a first filtered signal;
   a second low pass filter configured to receive the second mixed signal and to form a second filtered signal;
   wherein the phase difference is determined based on the first filtered signal and the second filtered signal.

4. The receiver system of claim 3, wherein the phase shift, $\Phi(\theta)$, applied by the phase shifter is $$\Phi(\theta) = \begin{cases} -\Phi_0 & \theta < \theta_0 \\ 0 & -\theta_0 < \theta < \theta_0 \\ \Phi_0 & \theta > \theta_0, \end{cases}$$

where $\theta=\sin^{-1}\lambda\delta/2\pi d$ is the angle of incidence, where $\delta$ is the determined phase difference, $\lambda$ is the wavelength of the received second signal, d is the distance between the first antenna and the second antenna, $\theta_0$ is half of a selected 3 dB beamwidth, and $\Phi_0$ is defined such that an array factor, $AF=1+e^{-j2\pi d\ sin(\theta)/\lambda}e^{-j\Phi_0}$ outside of the range $-\theta_0<\theta<\theta_0$ is minimum.

5. The receiver system of claim 4, further comprising a summer configured to form the output signal as a sum of the received first signal and the phase shifted second signal.

6. The receiver system of claim 2, wherein the phase shift, $\Phi(\theta)$, applied by the phase shifter is $$\Phi(\theta) = \begin{cases} -\Phi_0 & \theta < \theta_0 \\ 0 & -\theta_0 < \theta < \theta_0 \\ \Phi_0 & \theta > \theta_0, \end{cases}$$

where $\theta=\sin^{-1}\lambda\delta/2\pi d$ is the angle of incidence, where $\delta$ is the phase difference determined between the received first signal and the received second signal, $\lambda$ is the wavelength of the received second signal, d is the distance between the first antenna and the second antenna, $\theta_0$ is half of a selected 3 dB beamwidth, and $\Phi_0$ is defined such that an array factor, $AF=1+e^{-j2\pi d\ sin(\theta)/\lambda}e^{-j\Phi_0}$ outside of the range $-\theta_0<\theta<\theta_0$ is minimum.

7. The receiver system of claim 1, wherein the phase shift, $\Phi(\theta)$, applied by the phase shifter is $\Phi(\theta)=m2\pi d\ \sin\theta/\lambda$, where $\theta$ is the angle of incidence, $\lambda$ is the wavelength of the received second signal, d is the distance between the first antenna and the second antenna, and m>1.

8. The receiver system of claim 1, wherein the phase shift, $\Phi(\theta)$, applied by the phase shifter is $$\Phi(\theta) = 2\tan^{-1}\left(\frac{\theta}{\theta_{3dB}}\right) - 2\pi d\ \sin\theta/\lambda,$$

where $\theta$ is the angle of incidence, $\theta_{3\ dB}$ is a selected 3 dB beamwidth, $\lambda$ is the wavelength of the received second signal, and d is the distance between the first antenna and the second antenna.

9. The receiver system of claim 1, wherein the phase shifter comprises a direct differential phase shifter.

10. The receiver system of claim 9, wherein the direct differential phase shifter comprises:
a first microstrip line coupled to receive the received first signal and configured to form a first output signal that is a phase shifted version of the received first signal;
a second microstrip line coupled to receive the received second signal and configured to form the phase shifted second signal;
a nonlinear capacitor coupling the first microstrip line and the second microstrip line along their lengths; and
a summer configured to form the output signal as a sum of the first output signal and the phase shifted second signal.

11. The receiver system of claim 9, wherein the direct differential phase shifter comprises:
a first amplifier coupled to receive the received first signal and configured to form a first amplified signal;
a first microstrip line coupled to receive the first amplified signal and configured to form a first output signal that is a phase shifted version of the first amplified signal;
a second amplifier coupled to receive the received second signal and configured to form a second amplified signal;
a second microstrip line coupled to receive the second amplified signal and configured to form the phase shifted second signal;
a nonlinear capacitor coupling the first microstrip line and the second microstrip line along their lengths; and
a summer configured to form the output signal as a sum of the first output signal and the phase shifted second signal.

12. The receiver system of claim 9, wherein the direct differential phase shifter comprises:
a first down converter coupled to receive the received first signal and configured to form a first down converted signal at a lower frequency;
a first amplifier coupled to receive the first down converted signal and configured to form a first amplified signal;
a first microstrip line coupled to receive the first amplified signal and configured to form a first output signal that is a phase shifted version of the first amplified signal;
a second down converter coupled to receive the received second signal and configured to form a second down converted signal at the lower frequency;
a second amplifier coupled to receive the second down converted signal and configured to form a second amplified signal;
a second microstrip line coupled to receive the second amplified signal and configured to form the phase shifted second signal;
a nonlinear capacitor coupling the first microstrip line and the second microstrip line along their lengths; and
a summer configured to form the output signal as a sum of the first output signal and the phase shifted second signal.

13. The receiver system of claim 1, wherein the phase shifter comprises:
a differential amplifier coupled to receive the received first signal and the received second signal and configured to form an amplified differential signal;
an amplitude detector coupled to receive the amplified differential signal and configured to rectify the amplified differential signal and to convert the rectified differential signal to DC to form a DC signal; and
a voltage controlled phase shifter coupled to receive the DC signal and the received second signal and configured to use the DC signal to control the phase shift applied to the received second signal to form the phase shifted second signal.

14. The receiver system of claim 13, further comprising a summer configured to form the output signal as a sum of the received first signal and the phase shifted second signal.

15. The receiver system of claim 1, wherein the phase shifter comprises a digital filter configured to provide a phase difference, $\Phi(\theta)=m2\pi d\ \sin\theta/\lambda$ between a first digital version of the received first signal and a second digital version of the received second signal, where $\theta$ is the angle of incidence, $\lambda$ is the wavelength of the received second signal, d is the distance between the first antenna and the second antenna, and m>1.

16. The receiver system of claim 1, wherein the phase shifter comprises a digital filter configured to provide a phase difference, $$\Phi(\theta) = 2\tan^{-1}\left(\frac{\theta}{\theta_{3dB}}\right) - 2\pi d\ \sin\theta/\lambda$$

between a first digital version of the received first signal and a second digital version of the received second signal, where θ is the angle of incidence, $\theta_{3\,dB}$ is a selected 3 dB beamwidth, λ is the wavelength of the received second signal, and d is the distance between the first antenna and the second antenna.

17. The receiver system of claim 1, wherein the signal processing circuit further comprises:
   a first analog-to-digital converter (ADC) coupled to receive the received first signal and configured to form a first digital signal;
   a second ADC coupled to receive the received second signal and configured to form a second digital signal; and
   a digital filter configured to provide a phase difference, $$\Phi(\theta) = 2\,\tan^{-1}\left(\frac{\theta}{\theta_{3dB}}\right) - 2\pi d\,\sin\theta/\lambda,$$

between the first digital signal and the second digital signal to form a first filtered signal and the phase shifted second signal, where θ is the angle of incidence, $\theta_{3\,dB}$ is a selected 3 dB beamwidth, λ is the wavelength of the received second signal, and d is the distance between the first antenna and the second antenna.

18. The receiver system of claim 17, further comprising a summer configured to form the output signal as a sum of the first filtered signal and the phase shifted second signal.

19. The receiver system of claim 1, wherein signal processing circuit further comprises:
   a first down converter coupled to receive the received first signal and configured to form a first down converted signal at a lower frequency;
   a first analog-to-digital converter (ADC) coupled to receive the first down converted signal and configured to form a first digital signal;
   a second down converter coupled to receive the received second signal and configured to form a second down converted signal at the lower frequency;
   a second ADC coupled to receive the second down converted signal and configured to form a second digital signal; and
   a digital filter configured to provide a phase difference, $$\Phi(\theta) = 2\,\tan^{-1}\left(\frac{\theta}{\theta_{3dB}}\right) - 2\pi d\,\sin\theta/\lambda,$$

between the first digital signal and the second digital signal to form a first filtered signal and the phase shifted second signal, where θ is the angle of incidence, $\theta_{3\,dB}$ is a selected 3 dB beamwidth, λ is the wavelength of the received second signal, and d is the distance between the first antenna and the second antenna.

20. The receiver system of claim 1, wherein the signal processing circuit further comprises:
   a first analog-to-digital converter (ADC) coupled to receive the received first signal and configured to form a first digital signal;
   a second ADC coupled to receive the received second signal and configured to form a second digital signal; and
   a digital filter configured to provide a phase difference, $\Phi(\theta) = m2\pi d\,\sin\theta/\lambda$, between the first digital signal and the second digital signal to form a first filtered signal and the phase shifted second signal, where θ is the angle of incidence, λ is the wavelength of the received second signal, d is the distance between the first antenna and the second antenna, and m>1.

* * * * *

UNITED STATES PATENT AND TRADEMARK OFFICE
CERTIFICATE OF CORRECTION

PATENT NO. : 8,849,229 B2
APPLICATION NO. : 13/486269
DATED : September 30, 2014
INVENTOR(S) : Nader Behdad It is certified that error appears in the above-identified patent and that said Letters Patent is hereby corrected as shown below:

IN THE SPECIFICATION

Col. 5, Line 13

Delete "$\Phi_{out}) = (\theta) = \Phi_1(\theta) - \Phi_2(\theta)$" and replace with --$\Phi_{out}(\theta) = \Phi_1(\theta) - \Phi_2(\theta)$--

Col. 6, Line 40

Delete "$SF_{with}(\theta)|_{dB} = 10 \log(|y_1 \pm y_2|^2/|y_2|^2)$" and replace with --$SF_{with}(\theta)|_{dB} = 10 \log(|y_1 + y_2|^2/|y_2|^2)$--

Col. 7, Line 57

Delete "$\phi_{out/without}$" and replace with --$\Phi_{out/without}$--

Signed and Sealed this
Thirty-first Day of March, 2015

Michelle K. Lee
*Director of the United States Patent and Trademark Office*